United States Patent
Franks et al.

(10) Patent No.: US 10,313,144 B2
(45) Date of Patent: Jun. 4, 2019

(54) SYSTEM AND METHOD FOR INCIDENT REPORTING AND NOTIFICATION

(71) Applicants: Lennie Earl Franks, Oklahoma City, OK (US); Genesis Junia Franks, Oklahoma City, OK (US)

(72) Inventors: Lennie Earl Franks, Oklahoma City, OK (US); Genesis Junia Franks, Oklahoma City, OK (US)

( * ) Notice: Subject to any disclaimer, the term of this patent is extended or adjusted under 35 U.S.C. 154(b) by 633 days.

(21) Appl. No.: 14/298,512

(22) Filed: Jun. 6, 2014

(65) Prior Publication Data

US 2014/0365574 A1    Dec. 11, 2014

Related U.S. Application Data

(60) Provisional application No. 61/874,695, filed on Sep. 6, 2013, provisional application No. 61/832,217, filed on Jun. 7, 2013.

(51) Int. Cl.
  *G06F 15/16* (2006.01)
  *H04L 12/18* (2006.01)
(52) U.S. Cl.
  CPC .............................. *H04L 12/1895* (2013.01)
(58) Field of Classification Search
  USPC ........... 709/204, 223, 224; 707/776; 714/4.1
  See application file for complete search history.

(56) References Cited

U.S. PATENT DOCUMENTS

| | | | | |
|---|---|---|---|---|
| 2002/0116247 | A1* | 8/2002 | Tucker | G06Q 30/06 709/224 |
| 2009/0240796 | A1* | 9/2009 | Yokoyama | H04L 41/0893 709/223 |
| 2010/0037088 | A1* | 2/2010 | Krivopaltsev | H04L 41/0681 714/4.1 |
| 2011/0320492 | A1* | 12/2011 | Inghelbrecht | G06Q 50/30 707/776 |
| 2013/0157612 | A1* | 6/2013 | Cordero | H04W 4/22 455/404.2 |
| 2016/0291854 | A1* | 10/2016 | Addati | B60W 50/08 |
| 2017/0024531 | A1* | 1/2017 | Malaviya | G06F 19/325 |
| 2018/0151034 | A1* | 5/2018 | Eddins | H05B 37/0227 |
| 2018/0316381 | A1* | 11/2018 | Sharma | H04W 52/0235 |

* cited by examiner

*Primary Examiner* — Thanh T Nguyen
(74) *Attorney, Agent, or Firm* — Dunlap Codding, P.C.

(57) ABSTRACT

A non-transitory is described being operably coupled to a processor and storing processor executable instructions which when executed by the processor cause the processor to receive first information indicative of a school incident report by a reporter. The first information of the school incident report indicating at least a type of incident which violates one or more school policies and a location of the incident. The processor then selects one or more recipients from a group of notification recipients based on the first information. The processor then generates a notification indicative of the type of incident and the location of the incident. The processor then transmits a signal via a communications network indicative of the notification.

14 Claims, 14 Drawing Sheets

SYSTEM AND METHOD FOR INCIDENT REPORTING AND NOTIFICATION

CROSS REFERENCE TO RELATED APPLICATIONS/INCORPORATION BY REFERENCE STATEMENT

The present application claims the benefit under 35 U.S.C. 119(e) of U.S. Provisional Application No. 61/832,217, filed Jun. 7, 2013 and U.S. Provisional Application No. 61/874,695, filed Sep. 6, 2013. The entire disclosures of both applications are hereby expressly incorporated herein by reference.

FIELD OF DISCLOSURE

The inventive concepts disclosed herein generally related to emergency and non-emergency notification systems, and more particularly but not by way of limitation, to an incident reporting and school staff notification system and methods.

BACKGROUND

In their daily activities, teachers carry out a variety of duties and tasks including classroom teaching, curriculum programming and planning, production of teaching resources, production of assessment instruments, marking and recording assessment results, and recording attendance and details of student behavior and other care issues. School staff, employees, and security officers often assist teachers in detailing and monitoring student behavior in class, on school grounds, at bus stops, and on busses to and from school. Teachers, staff, and security officers often need additional assistance monitoring student behavior and watching for unauthorized people on school grounds. Students, parents, care givers, and community members often provide the additional assistance in monitoring and reporting inappropriate student behavior or unauthorized people on school grounds.

Due to bullying, peer pressure, and other factors, students are often hesitant to report inappropriate student behavior where other students within the school or within their peer groups are likely to discover the reporting. Anonymity of reporting is often important to a student in deciding to report inappropriate behavior in the school setting, so that the student may avoid peer pressure or bullying as a response to reporting an incident. When students leave the scene of an incident of inappropriate behavior, such as bullying, to report the behavior to school staff, the incident has often moved or been resolved by the time staff arrives to respond to the report. Anti-bullying applications for mobile devices have been created in an attempt to aid in limiting bullying and reporting inappropriate behavior, as well as quicken staff response time. Some anti-bullying applications allow video recording and uploading of incidents in real or near real time, entering a text or hotline telephone number to a list of contacts, sending an email to a person or contact telling them of the incident, and audio recording incidents followed by emailing the recordings to a list of contacts. Some of the anti-bullying applications incorporate global positioning system (GPS) tracking to enable use of location data with the application.

In reporting inappropriate behavior, time is of the essence. These applications often require texting or typing of pertinent information into an email or text screen, in a free typing format, as would be experienced by a user sending a text or email message. Long form texting or typing requires the user reporting a bullying or other inappropriate behavioral incident to determine a type of incident, describe the information, determine the location, describe the location, and then cause the application to send the report to one or more people on a contact list. In addition to time delays for reporting, these applications do little to provide anonymity to students reporting an incident. Further, the person or persons notified of the incident are usually on a static list, receiving notifications of incidents regardless of the type of incident the application is used to report.

There is a need for a system, application, and program which better enables anonymity in reporting incidents of inappropriate behavior, speeds the reporting of the incident, reduces the possible number of errors from a free typing format, and tailors the reporting notification to enable appropriate responses to incidents of varying types from responders with appropriate skill sets.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one embodiment, a non-transitory medium is described being operably coupled to a processor and storing processor executable instructions which when executed by the processor cause the processor to receive first information indicative of a school incident report by a reporter. The first information of the school incident report indicates at least a type of incident which violates one or more school policies and a location of the incident. The processor then selects one or more recipients from a group of notification recipients based on the first information. The processor then generates a notification indicative of the type of incident and the location of the incident, and transmits a signal via a communications network indicative of the notification.

In another version, an incident reporting and notification system is described. The incident reporting and notification system has one or more processor configured to execute processor executable instructions, one or more imaging device operably connected to the one or more processor, and one or more non-transitory processor readable medium, operably coupled to the one or more processor and the one or more imaging device, the one or more non-transitory processor readable medium storing processor executable instructions. The processor executable instructions when executed by the processor cause the processor to receive an image indicative of an identifier linked to a website. The processor then accesses the website via the identifier and then supplies the first information to populate a school incident report. The school incident report indicates at least a type of incident which violates one or more school policies and a location of the incident.

In another embodiment, a mobile device is described as having one or more processor configured to execute processor executable instructions and one or more non-transitory processor readable medium, operably coupled to the one or more processor and storing processor executable instructions. The processor executable instructions when executed by the processor cause the processor to receive first information indicative of a school incident report by a reporter. The school incident report indicates at least a type of incident which violates one or more school policies and a location of the incident. The processor then selects one or more recipients from a group of notification recipients. The processor then generates a notification indicating the type of incident and the location of the incident and transmits a signal indicative of the notification over a communications network.

BRIEF DESCRIPTION OF THE DRAWINGS

Certain embodiments of the present inventive concepts will hereafter be described with reference to the accompanying drawings, which are not intended to be drawn to scale, wherein like reference numerals denote like elements. For purposes of clarity, not every component may be labeled in every drawing. Certain features and certain views of the figures may be shown exaggerated and not to scale or in schematic in the interest of clarity and conciseness. A more complete appreciation of the inventive concepts disclosed herein and many of the attendant advantages thereof will be readily understood by reference to the following detailed description when taken in conjunction with the accompanying drawings, in which:

FIG. 4A is an embodiment of an image capture screen for capturing an image of an identifier and the identifier. FIG. 4B is an embodiment of a screen prompting access to a website from the image of the identifier.

FIG. 5A is a screen shot of an incident report form. FIG. 5B is a screen shot of a type of incident selected on the incident report form of FIG. 5A. FIG. 5C is a screen shot of a type of incident input field of the incident report form of FIG. 5A. FIG. 5D is a screen shot of a location of the incident selected on the incident report form of FIG. 5A. FIG. 5E is a screen shot of a notification generated from the incident report form. FIG. 5F is another screen shot of a notification generated from the incident report form. FIG. 5G is another screen shot of a notification generated from the incident report form.

FIG. 6A is a screen shot of an exemplary mode for the incident report and notification program. FIG. 6B is a screen shot of multiple exemplary modes for the incident report and notification program.

DETAILED DESCRIPTION

Figure 1:
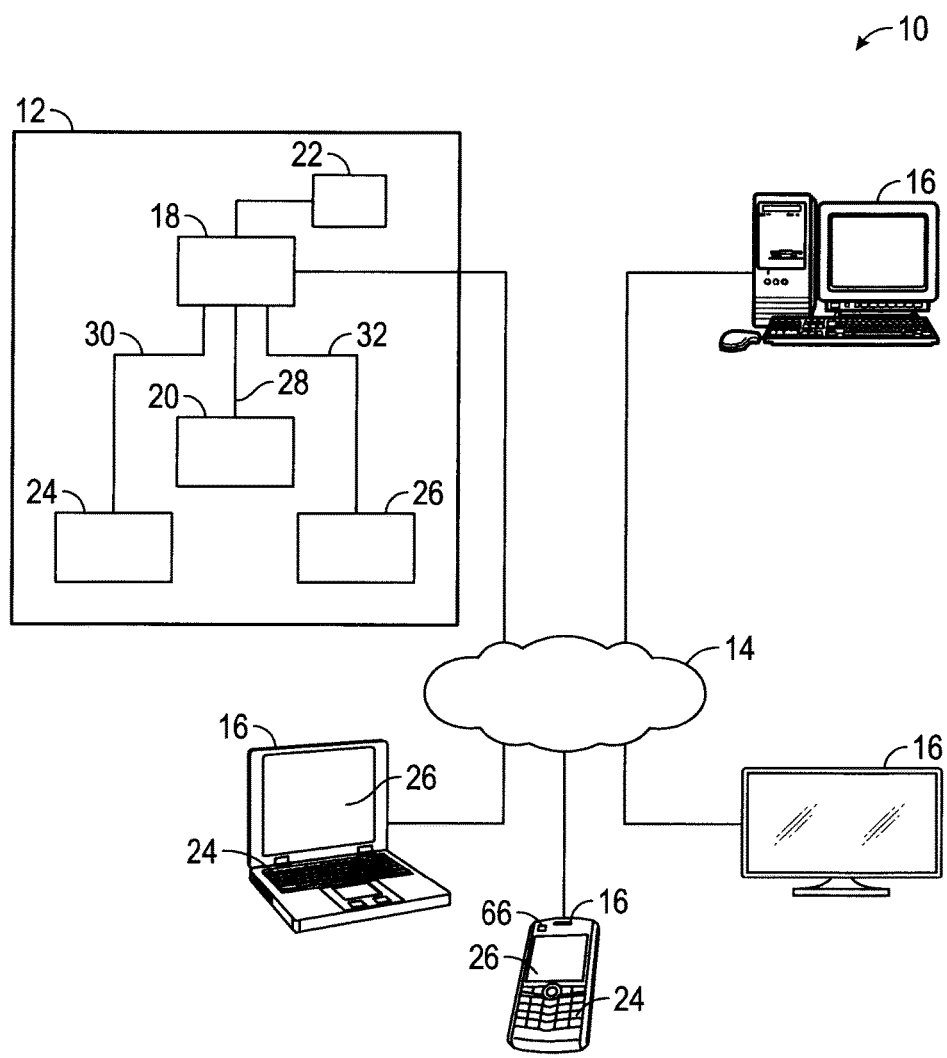
FIG. 1 is a schematic of hardware and computer executable instructions constructed in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts disclosed herein may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment, although the inventive concepts disclosed herein are intended to encompass any and all combinations and permutations of the features of the embodiments described herein.

Finally, as used herein qualifiers such as "about," "approximately," and "substantially" are intended to signify that the item or value being qualified is not limited to the exact value or amount specified, but includes some slight variations or deviations therefrom, caused by measuring error or imprecision, manufacturing tolerances, stress exerted on various parts, wear and tear, and combinations thereof, for example.

The inventive concepts disclosed herein are generally directed to an incident reporting and notification system, which, in one embodiment, may include a computer based system configured to receive information indicative of one or more incident report from one or more user devices (e.g., the incident report including illegal, suspicious, inappropriate activities as determined by the rules/laws governing the location of the activities), generate one or more notification indicative of the one or more incident report, determine one or more recipients within a group of notification recipients to receive the notification based on the information in the incident report, and transmit the notification to the one or more recipients indicative of the one or more incident reports. Although, for the sake of clarity, the incident reporting and notification system is described with regards to use in a school setting, the incident reporting and notification system may be used in a school setting, multiple building school system, a university campus, a series of related university campuses, airports, businesses, multiple related business facilities, military facilities, police department facilities, prison facilities, cities, emergency camps, refugee camps, housing communities, apartment buildings, or any other place where it may be appropriate for individuals to report certain behaviors, actions, situations, natural disasters, or other emergency and non-emergency scenarios to one or more designated notification recipients from a group of notification recipients.

The system may be accessible to users via a website, user device (e.g., mobile device, smartphone, tablet, personal digital and/or assistant) application, and/or stationary terminal (e.g., a kiosk, emergency phones, or other stationary computing device). The application, website, and/or stationary terminal allow a reporter (i.e., a user reporting an incident to the system) to register with the system and provide information such as names, locations, identification, times, photographs, videos, or other suitable information indicative of an incident, using a dynamic form or template, to be reported to one or more recipient (i.e., a user receiving notification of an incident from the system). The information provided by the reporter may be organized and stored by the incident reporting and notification system and provided in a searchable database, for example to correlate locations of, type of, or persons involved in reported incidents. The incident reporting and notification system, may use the information provided by the reporter to categorize the incident being reported, determine and select one or more recipient from a group of potential notification recipients suitable to receive a notification of the incident, and notify the one or more selected recipients of the incident. The one or more recipient may be selected based on one or more of a plurality of factors, such as job status, vacation schedule, health/sick leave, location, qualifications, or other factors, for example.

Referring now to FIG. 1, one embodiment of an incident reporting and notification system 10 is shown according to the inventive concepts disclosed herein. The incident reporting and notification system 10 may comprise one or more server 12 housed on a communications network 14 and capable of interfacing and/or communicating with one or more user device 16 over the network 14. The server 12 may be implemented as any desired computer system and may form a host system or a web server hosting a website. The network 14 may be any desired network, such as the Internet, a local area network, an optical network, a wireless network, a cellular network, a public telephone network, a circuit switched network, a packet switched network, datagram network, virtual circuit network, a satellite network, a 3G network, a 4G network, a metropolitan network, a bluetooth network, or combinations thereof, for example.

The server 12 may comprise one or more personal computers, mainframe computers, servers, web servers, local servers, internet servers, virtual servers, distributed servers, distributed computer networks, and combinations thereof. In one embodiment, the server 12 may have at least one processor 18 capable of executing processor executable instructions, a non-transitory processor readable medium 20 capable of storing processor executable instructions, a database 22, an input device 24, and an output device 26, all of which can be partially or completely network-based or cloud-based, and may not necessarily be located in a single physical location. The server 12 may be hosted on the network 14, in some exemplary embodiments of the inventive concepts disclosed herein, or may be otherwise operably coupled with the network 14.

The processor 18 can be implemented as a single processor or multiple processors working together to execute processor executable instructions including the logic described herein. Exemplary embodiments of the processor 18 may include a digital signal processor (DSP), a central processing unit (CPU), a field programmable gate array (FPGA), a microprocessor, a multi-core processor, a quantum processor, application-specific integrated circuit (ASIC), a graphics processing unit (GPU), a visual processing unit (VPU) and combinations thereof. The processor 18 is operably coupled with the non-transitory processor readable medium 20 via a path 28 which can be implemented as a data bus allowing bi-directional communication between the processor 18 and the non-transitory processor readable medium 20, for example. The processor 18 is capable of communicating with the input device 24 and with the output device 26 via paths 30 and 32 including one or more data busses, for example. The processor 18 may be further capable of interfacing and/or bi-directionally communicating with the user device 16 via the network 14, such as by exchanging electronic, digital, analogue, and/or optical signals via one or more physical, virtual, or logical ports using any desired network protocol such as TCP/IP, for example. It is to be understood that in certain embodiments using more than one processor 18, multiple processors may be located remotely from one another, located in the same location, or comprising a unitary multi-core processor (not shown). The processor 18 is capable of reading and/or executing processor executable code stored in the one or more non-transitory processor readable medium 20 and/or of creating, manipulating, altering, and storing computer data structures into the one or more non-transitory processor readable medium 20.

The non-transitory processor readable medium 20 may store an incident reporting and notification program having processor executable instructions. The non-transitory processor readable medium 20 may be implemented as any type of memory, such as random access memory (RAM), a CD-ROM, a hard drive, a solid state drive, a flash drive, a memory card, a DVD-ROM, a floppy disk, an optical drive, and combinations thereof, for example. While the non-transitory processor readable medium 20 may be located in the same physical location as the processor 18, the non-transitory processor readable medium 20 may also be located remotely from the processor 18 and may communicate with the processor 18 via the network 14. Additionally, when more than one non-transitory processor readable medium 20 is used, one or more non-transitory processor readable medium 20 may be located in the same physical location as the processor 18, and one or more non-transitory processor readable medium 20 may be located in a remote physical location from the processor 18. The physical location of the non-transitory processor readable medium 20 can be varied, and the non-transitory processor readable medium 20 may be implemented as a "cloud memory", i.e., one or more non-transitory processor readable medium 20 which is partially, or completely based on or accessed using the network 14, for example. Further, the one or more processor 18 may not communicate directly with the non-transitory processor readable medium 20, but may communicate with another processor 18 communicating with the non-transitory processor readable medium 20 over the network 14, for example. In some exemplary embodiments, the processor 18 may include a first processor communicating with a second processor executing processor executable instructions including an incident reporting and notification program over the network 14. The second processor 18 may be part of a computer station (not shown), or may be a part of a separate computer system or server configured to communicate with the server 12 over the network 14 or otherwise operably coupled with the server 12, for example.

The input device 24 may pass data to the processor 18, and may be implemented as a keyboard, a mouse, a touchscreen, a camera, a cellular phone, a tablet, a smartphone, a personal digital assistant (PDA), a microphone, a network adapter, and combinations thereof, for example. The input device 24 may also be implemented as a stylus, a mouse, a trackball, and combinations thereof, for example. The input device 24 may be located in the same physical location as the processor 18, or may be remotely located and/or partially or completely network-based.

The output device 26 passes information from the processor 18 to a user in a user perceivable format. For example, the output device 26 can be implemented as a server, a computer monitor, a cell phone, a smartphone, a tablet, a speaker, a website, a PDA, a fax, a printer, a projector, a laptop monitor, and combinations thereof. The term "pass" as used herein may refer to either push technology, or to pull technology, and to combinations thereof. The output device 26 can be physically co-located with the processor 18, or can be located remotely from the processor 18, and may be partially or completely network based (e.g., a website). The output device 26 communicates with the processor 18. As used herein, the term "user" is not limited to a human, and may comprise a human, a computer, a host system, a smartphone, a tablet, and combinations thereof, for example.

The network 14 may be implemented as a wireless and/or wired network 14 (e.g., the world wide web or Internet, or any other computer network configured to allow bi-directional exchange of data and/or signals between computer processors), and may permit bi-directional communication of information and/or data between the server 12 and/or one or more user device 16 operably coupled with the network 14, for example.

The network 14 may interface with the server 12 and with the user device 16 operably coupled with the network 14 in a variety of ways, such as by optical, wireless, wired, and/or electronic interfaces, and may use a plurality of network topographies and protocols, such as Ethernet, TCP/IP, circuit switched paths, and combinations thereof, for example. The network 14 may use a variety of network protocols to permit bi-directional interface and communication of data and/or information between the server 12 and the user device 16 operably coupled with the network 14. The network 14 may be secured using any desired secured networking protocol, such as a gateway server, a firewall, data encryption, public or private key cryptography infrastructure, secure socket layer protocol, hypertext transfer protocol secure, a virtual private network, a tunnel, secure shell, and any combinations thereof, for example.

The user device 16 may be connected or otherwise operably coupled with the network 14, and can be implemented as a smartphone, a tablet, a laptop computer, a personal computer, a desktop computer, a computer terminal, a computer workstation, an e-book reader, a wireless network-capable handheld device, a digital video recorder, a personal digital assistant, a kiosk, an emergency telephone station, or combinations thereof, for example. Similar to the server 12 described above, in one embodiment, the user device 16 may be provided with one or more processor (not shown), one or more non-transitory processor readable medium (not shown), an input device (not shown), and an output device (not shown). The processor, the one or more non-transitory processor readable medium, the input device, and the output device of the user device 16 may be implemented similarly to or the same as the processor 18, the one or more non-transitory processor readable medium 20, the input device 24, and the output device 26, respectively. The user device 16 may be capable of interfacing with the network 14, via a wireless or wired interface. The one or more non-transitory processor readable medium of the user device may store processor executable instructions or software applications, and a web browser or a smartphone application (e.g., native software application running on a user device and configured to communicate with a web server over a computer network) running on the user device 16 and capable of accessing a website and/or communicating information and/or data with a web server such as the server 12 over a network, such as the network 14.

The database 22 may be implemented as any desired non-transitory computer readable medium configured to store processor executable instructions and/or data, for example. The database 22 is operably coupled with the processor 18 (e.g., directly or via the network 14) so that the database 22 and the processor may exchange data and/or signals hi-directionally with one another. It is to be understood that in some exemplary embodiments, the database 22 may be implemented as a part of the non-transitory processor readable medium 20, while in some exemplary embodiments the database 22 may be located at a separate physical location from the system 10 and may be operably coupled with the processor 18 via the network 14.

The incident reporting and notification system 10 may include processor executable instructions 40 which may comprise one or more computer program having processor executable instructions written in any suitable programming language, such as C++, C#, Java, Python, Perl, Binary, assembly language, or other high or low level programming language, for example. The computer program for the incident reporting and notification system 10 according to the inventive concepts disclosed herein may be implemented as processor executable instructions, software, firmware, or a combination of software and firmware, for example, and may be at least partially stored in the non-transitory processor readable medium 20. The server 12 may access and execute the processor executable instructions to execute at least a portion of the incident reporting and notification system 10 and each of the one or more user device may execute processor executable instructions to execute a remaining portion of the incident reporting and notification system 10, for example.

In some exemplary embodiments, the server 12 may communicate (e.g., bi-directionally exchange data and/or processor executable instructions) with a separate computer system (not shown) or computer server (not shown) operably coupled with the network 14 and executing an incident reporting and notification system 10 over the network 14, as will be appreciated by a person of ordinary skill in the art having the benefit of the instant disclosure.

In one embodiment, the processor executable instructions 40 include an incident reporting and notification program 40-1. The non-transitory processor readable medium 20 may also store other processor executable instructions 40-2 such as an operating system and application programs such as a word processor or spreadsheet program, for example. The processor executable instructions for the incident reporting and notification program 40-1 and the other processor executable instructions 40-2 may be written in any suitable high level or low level programming language as described above.

Figure 2:
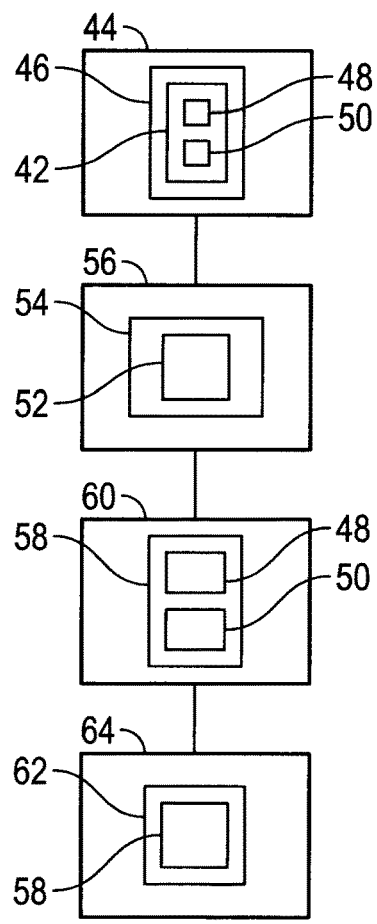
FIG. 2 is a diagram of one embodiment of the execution of processor executable instructions stored on a non-transitory processor readable medium forming an incident reporting and notification program in accordance with the inventive concepts disclosed herein.
Figure 3:
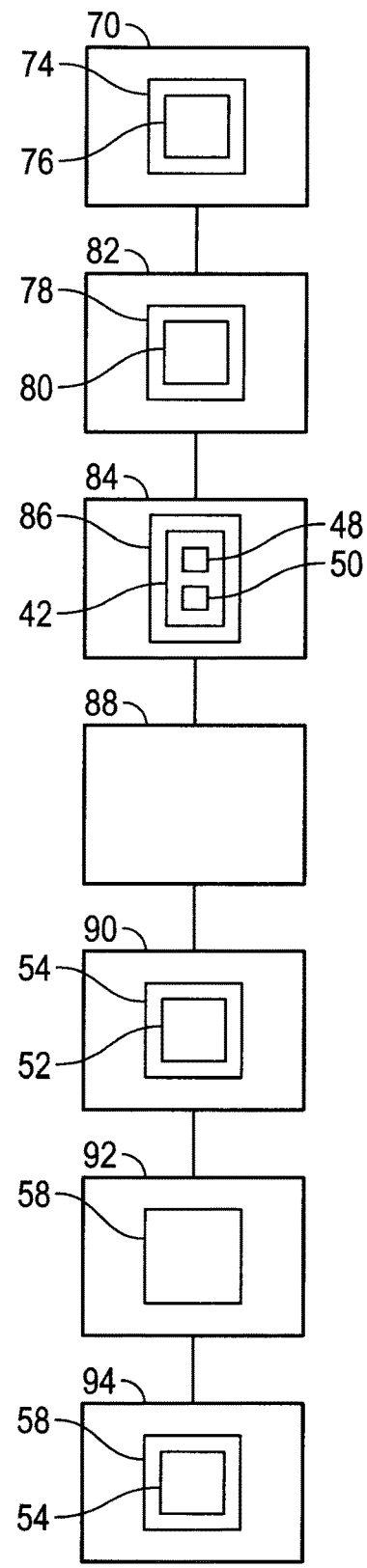
FIG. 3 is a diagram of the execution of another version of processor executable instructions stored on a non-transitory processor readable medium forming an incident reporting and notification program in accordance with the inventive concepts disclosed herein.

Referring now to FIG. 2, therein shown is a representation of one embodiment of the incident reporting and notification program 40-1. As previously discussed, at least a portion of the incident reporting and notification program 40-1 may be stored on the one or more non-transitory processor readable medium 20 of the server 12. When executed, the incident reporting and notification program 40-1 may cause the one or more processor 18 to receive first information 42, as indicated by block 44, from one or more reporter 45 using the incident reporting and notification system 10. The first information 42 may be indicative of a school incident report 46. The first information 42 may comprise at least a type of incident 48 and a location of the incident 50. The incident reporting and notification program 40-1 may then select one or more recipients 52 from a group of possible notification recipients 54 based on the first information 42, as indicated by block 56. The processor 18 may then generate a notification 58 indicative of the type of incident 48 and the location of the incident 50, as indicated by block 60. The processor 18 may then transmit a signal 62 indicative of the notification 58 via the communications network 14 to the one or more recipients 52, as indicated by block 64.

The first information 42, as described above, may be any information comprising the type of incident 48 and the location of the incident 50. With regard to the type of incident 48, the incident reporting and notification program 40-1 may provide a list or menu of predetermined types of incident 48 appropriate for the setting in which the system 10 is used. For example, in the school setting embodiment, the first information 42 may be indicative of a school incident report 46, where the type of incident 48 violates one or more school policies or one or more laws, statutes, rules, regulations, or the like (hereinafter referred to as school policies), involving a school which may be appropriately or desirably reported to law enforcement or school authorities. The incident reporting and notification program 40-1 may provide options for the reporter 45 to indicate the type of incident 48 from a list or menu of predetermined types of incidents 48, as previously stated. For example, in the school setting embodiment, the incident reporting and notification program 40-1 may provide predetermined types of incidents 48 selectable, by the reporter 45, from a group comprising fight, bullying, stranger danger, active shooter, sexual misconduct, first aid, panic, weapon on campus, drugs on campus, drug use, theft, arson, gang activity, teacher assault, and the like. In one embodiment, the selectable predetermined types of incidents 48 may be provided in selectable radio buttons. In another embodiment, the types of incidents 48 may be provided as a list of choices in a dial or scrolling menu. The incident reporting and notification program 40-1 may also allow the type of incident 48 to be entered into a data entry field via text, photo, video recording, audio recording, combinations thereof, or any other suitable data capable of identifying or assisting in the identification of the type of incident. For example, in an industrial setting, the type of incident 48 may be a malfunction or maintenance issue which is not listed in the predetermined menus for the type of incident 48 and necessitates the use of a picture to succinctly describe the type of incident 48.

The first information 42 may also comprise any information indicative of the location of the incident 50. The incident reporting and notification program 40-1 may provide options for the reporter 45 to indicate the location of the incident 50 from a list of predetermined locations of incidents 50, appropriate to the setting in which the system 10 is used. For example, in the school setting embodiment, the incident reporting and notification program 40-1 may provide predetermined locations of incidents selectable, by the reporter 45, from a group comprising a school building, a location within a school building, a school bus, a school bus stop, a location between a home of a student and a school bus stop, a school grounds, a location within school grounds, and other school related areas. The location within the school building may comprise, for example, a hallway, a classroom, a bathroom, a gymnasium, offices, annexes, portable buildings, a cafeteria, a theater/stage, and other applicable locations within a school building. The location within the school grounds may comprise, for example, a playground, a basketball court, a football/soccer/baseball field, a stadium, and other areas located on or about the school grounds. The list of predetermined locations of incidents 50 may be provided as selectable radio buttons, a scrolling/dial menu, or other suitable predetermined list. The incident reporting and notification program may also allow the location of the incident 50 to be entered into a data entry field via text, photo, video recording, audio recording, combinations thereof, or any other suitable data capable of identifying or assisting in the identification of the location of the incident 50 which may not be in the predetermined list of locations of incidents 50. In some additional embodiments, the incident reporting and notification program 40-1 may automatically generate the location of the incident 50 based on an automatically determined location of the reporter 45, such as a GPS location, a location triangulated from communications towers, or any other automatically determined location.

The incident reporting and notification program 40-1 may also enable one or more authorized personnel to add or remove one or more of the types of incident 48 and one or more of the locations of incidents 50 to/from the respective predetermined lists to better tailor the incident reporting and notification system 10 to the setting in which it is used.

The first information 42 may additionally include any information which may aid in identification of an incident to be reported. For example, in some embodiments, the first information 42 may also include time, identification information, and other information. In situations where the reporter 45 is reporting an incident taking place contemporaneous with the report, the time to be reported may be automatically input by the incident reporting and notification program 40-1 based on an input received from the processor 18 (i.e., reported by a system clock on the user device 16 or the server 12) or may be manually input by the reporter 45. In situations where the reporter 45 is reporting an incident that has already taken place or will occur in the future, the time of the incident may be input manually into the reporting and notification program 40-1 by the reporter 45 to accurately report the timing of the incident. An example of an incident that has already taken place may be an incident that occurred when the reporter 45 did not have access to the incident reporting and notification system 10. An example of an incident that will occur in the future may be a fight to take place after school hours, where the reporter 45 learns of the time and place of the fight prior to its occurrence.

Identification information may comprise information identifying an individual who precipitated or was involved in the incident to be reported using the incident reporting and notification system 10. For example, identification information may comprise name, description, gender, height, race/ethnicity, clothes, tattoos, scars, and other identifying characteristics. The incident reporting and notification program 40-1 may provide predetermined identification information options, enabling the reporter to choose one or more identification options. Additionally, the incident reporting and notification program 40-1 may enable authorized users to add additional predetermined options for other information applicable to the setting, location, and type of incidents to be reported. The incident reporting and notification program 40-1 may also provide a data entry field, such as a text box, text editable field, or other input field configured to enter the identification information not listed among the predetermined identification information options. This other input field may accept input in the form of text, voice recording, images, video recordings, or any other suitable input capable of serving as identification information.

Other information may comprise any other information that the reporter 45 may find pertinent in reporting an incident. The incident reporting and notification program 40-1 may provide a data entry field, such as a text box, text editable field, or other input field configured to receive the other information not listed among the predetermined options for the type of incident 48, the location of the incident 50, the time, and the identification information. The data entry field may accept input in the form of text, voice recording, images, video recordings, or any other suitable input capable of providing additional information not accounted for by the type of incident 48, the location of the incident 50, the time, and the identification information. Additionally, the incident reporting and notification program 40-1 may enable authorized users to add additional predetermined options for other information applicable to the setting, location, and type of incidents to be reported.

The one or more reporter 45, as previously indicated, may be a user of the incident reporting and notification system 10. The reporter may be any user of the incident reporting and notification system 10 including one of the one or more recipients 52 designated from among the group of possible notification recipients 54 within the incident reporting and notification system 10. In one embodiment, where the incident reporting and notification system 10 is used in a school setting, for example, the reporter 45 may be a student, a parent, a caregiver (i.e., a non-parent responsible for a student), a teacher, a principal, an administrative personnel, an administrative staff member, a janitorial or custodial staff member, an upper level school administration (i.e., superintendent, superintended staff, school board member, or the like), a bus driver, a security staff member, a school resource officer, a member of a police department, an individual within the community, a coach, school district personnel, and other school and school district staff. As noted above, the group of notification recipients 54 may be the same as the potential reporters 45 or may be different depending on the type of incident 48, the location of the incident 50, the environment in which the system 10 is used, and other factors. For example, where the system 10 is used in a business campus, a member of the public or individual within the community may be a reporter 45 but not be within the group of possible notification recipients 54.

The one or more recipients 52, as previously referenced, may be a user of the incident reporting and notification system 10 and may be one of the group of possible notification recipients 54. For example, in the school setting embodiment, the group of possible notification recipients 54 may be chosen from the group comprising: a student, a parent, a caregiver, a teacher, a principal, an administrative personnel, an administrative staff member, a janitorial or custodial staff member, an upper level school administration, a bus driver, a security staff member, a school resource officer, a member of a police department, an individual within the community, a coach, school district personnel, and other school and school district staff. Additionally, in some embodiments, the one or more recipient 52 may not be a user of the incident reporting and notification system 10, such as a police department, where the police department receives the notification 58 via text, email, 911 system, tip line, as a push notification, or other conventional police reporting method.

Upon receiving the first information 42, the incident reporting and notification program 40-1 may cause the processor 18 to select the one or more recipient 52 from the group of possible notification recipients 54, as referenced above with regard to block 56. The incident reporting and notification program 40-1 may provide processor executable instructions to enable selection of the one or more recipient 52 in a separate program within the incident reporting and notification system 10 or within the incident reporting and notification program. The processor executable instructions may be in the form of logic, algorithms, correlation tables, relational data databases, lookup tables, spreadsheets, authorization credentials, and other instructions. In one embodiment, the incident reporting program 40-1 may cause the processor 18 to select the one or more recipients based on one or more elements of the first information 42, such as the type of incident 48, the location of the incident 50, the time, the identification information, or the other information. Additionally, certain of the group of possible notification recipients 54 may be excluded from notification of certain incidents based on the above or different factors. For example, in the school setting environment, as described above where the type of incident 48 is an active shooter, police, security, and/or school resource officers may be among those selected as the one or more recipients 52. Where the type of incident 48 is a fight, security, school resource officers, and principals may be selected as the one or more recipients 52. Additionally, in the case of a fight, one or more teachers within the school may be notified based on the teachers' location relative to the fight, such that one or more teacher in close proximity is notified but a teacher across campus is not. As another example, where the type of incident 48 is custodial in nature (i.e., spill, mess, vomit, etc.) custodial staff may be selected as the one or more recipients 52 without notifying police, security, and/or school resource officers.

The notification 58, as described above, may be indicative of at least the type of incident 48 and the location of the incident 50. The incident report and notification program 40-1, after receiving the first information 42, may cause the one or more processor 18 to transmit the notification 58 or the signal 62 indicative of the notification 58 to the one or more selected recipients 52. The notification 58 may be in the form of a text message, an email, an in-application notification, a system notification, a telephone call, a conference call, a loudspeaker announcement, a siren, an automated door lock, an automated window lock, a 911 call or other appropriate notifications or actions. In one embodiment, the notification 58 may be accompanied by sounds from the user device 16 such as those associated with mobile devices, buzzing, ringtones, alarms, and alert sounds, for example, or other sounds that may alert a user to the notification 58. Further in other embodiments, the notification 58 may be accompanied by one or more changes in a display of the user device 16 such as changes in screen color, changes in appearance such as new pictures or instructions, and other changes that may alert the user to a notification 58. An embodiment of the notification 58 may be a text message sent to a recipient's 52 mobile device. Further, in some embodiments, the notification 58 may comprise two or more of the aforementioned types of notifications. The notification 58 may be in the form of an informational notice 58-1 (e.g., the text message or email) and/or an action 58-2 (e.g., loudspeaker announcement, the siren, or the automated door lock).

The informational notice 58-1 may indicate the type of incident 48, the location of the incident 50, and instructions on a particular set of actions assigned to the recipient 52 of the notification 58, for example. With regard to the instructions on a particular set of actions, the instructions may be one or more instructions assigned to the recipient 52 from a predetermined set of instructions, such as school emergency protocols including escape routes for fire drills, procedures for active shooter drills, or safe areas in case of tornado, for example. The set of actions may be tailored to the specific recipient 52, such as instructing a security officer to respond to a fight, instructing a teacher to lock a classroom door in the case of stranger danger or an active shooter, or instructing a principal or other member of the staff to initiate a fire alarm in case of a fire, for example.

The action 58-2 may connect to one or more networked systems and cause the one or more networked systems to perform an action. With regard to the action 58-2, the action 58-2 may be a predetermined operation performed by the one or more networked system in response to a specified notification 58, type of incident 48, or location of incident 50. For example, in the school setting embodiment, the action 58-2 may cause one or more door or window locks, in communication with the incident reporting and notification system 10, to automatically lock upon receipt of the notification 58. By way of additional example, a lockdown of a plurality or all of the doors and/or windows may be enabled based on authorizations, as will be described below. In some embodiments, the notification 58 may be an information notice 58-1 and an action 58-2. For example, a notification 58 of an active shooter may be a combination of a text message to the selected recipients 52, a loudspeaker announcement, an automated door lock of any applicable doors, and an automated window lock of any applicable windows. The text message may notify the police and school staff including teacher, principals, and security of the incident. The loudspeaker announcement may notify school staff unable to receive the text message, students, and the active shooter to remain in place, that the doors are locked, and that police have been notified of the presence of an active shooter. Finally, the automated door and window locks may automatically lock doors and windows in communication with the incident reporting and notification system 10 to prevent the active shooter from accessing classrooms or leaving a predetermined area before police arrive.

The signal 62 may be the notification 58, or may be another electronic, analogue, or other suitable signal capable of transmitting information indicative of the notification 58 across the communications network 14 to perform the action or notification requisite of the notification 58 being transmitted.

Figure 4A:
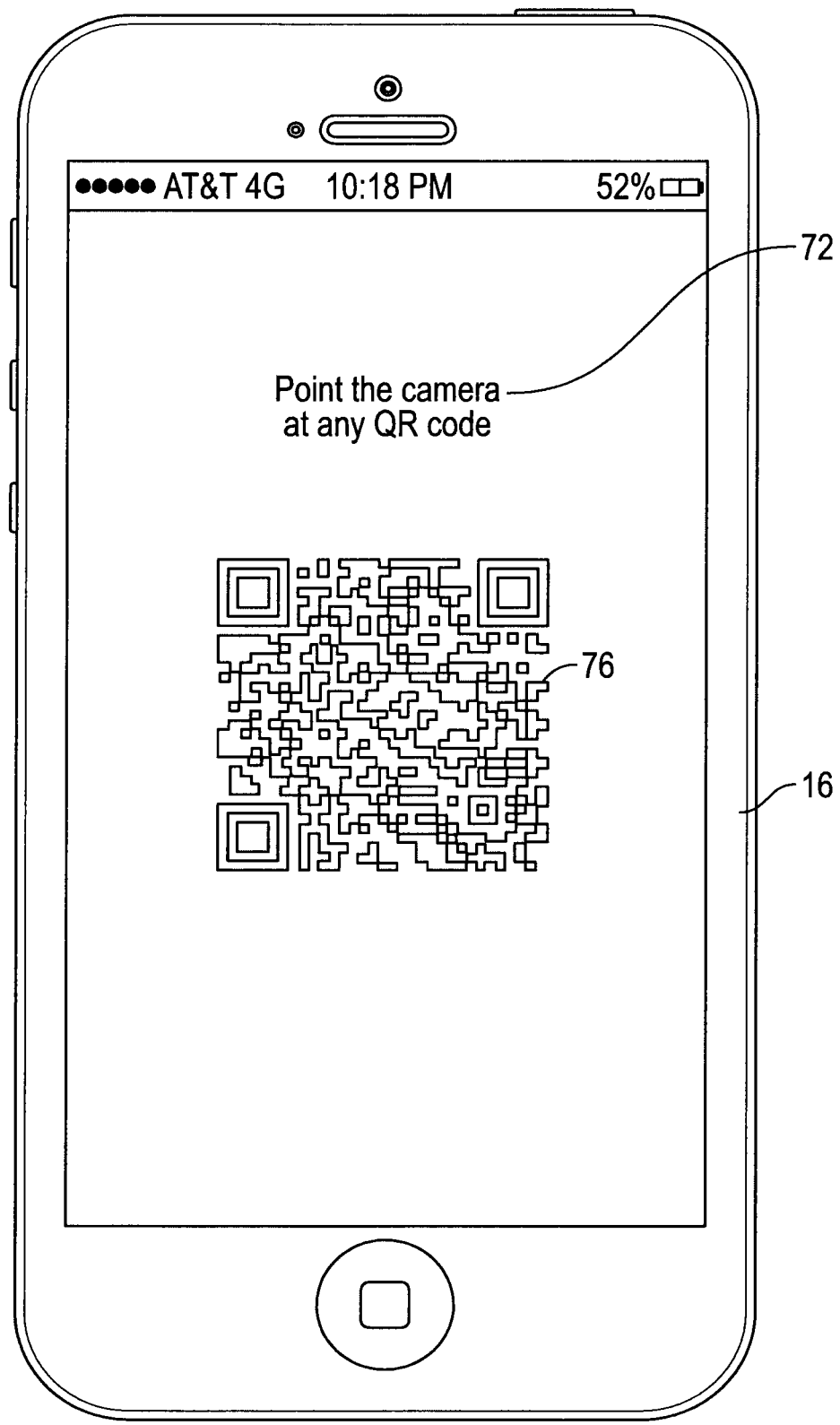
FIGS. 4A-4B depict exemplary screenshots generated by a user device executing one embodiment of the incident reporting and notification program in accordance with the inventive concepts disclosed herein.
Figure 4B:
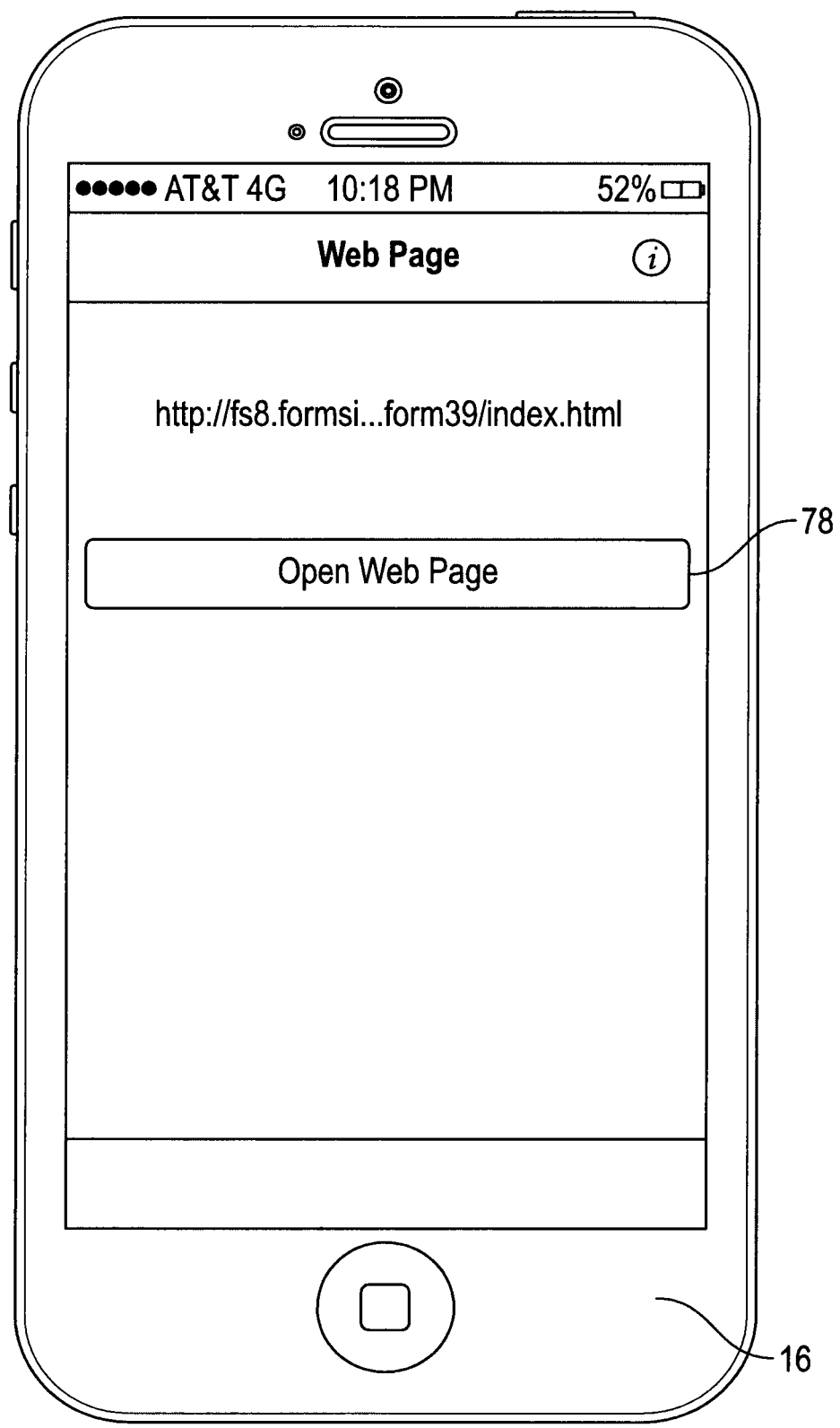

Referring now to FIGS. 3, 4A-B, and 5A-D, in use, in one embodiment at least a portion of the incident reporting and notification program 40-1 may be stored on a mobile device, such as the user device 16 implemented as a smartphone, having at least one imaging device 66, shown in FIG. 1, in addition to the processor (not shown) of the user device 16, the one or more non-transitory processor readable medium (not shown) of the user device 16, the input device 24, the output device 26, and the processor executable instructions 40. The incident reporting and notification program 40-1 may be executed, as indicated by block 70, causing the processor of the user device 16 to generate an initiation screen 72, an exemplary embodiment of which is shown in FIG. 4A. The initiation screen 72 may prompt the user to use the imaging device 66 to capture one or more images 74 of an identifier 76 thereby causing the processor of the user device 16 to receive the image 74 indicative of the identifier 76 which is linked to a website 80. An exemplary embodiment of the identifier 76 is shown in FIG. 4A. The identifier 76 may be implemented as a two-dimensional bar code, a bar code, a steganographic image, an image, a number, or any other suitable identifier. The identifier 76 may be encoded with a link to the website 80 and may be configured to cause the processor of the user device 16 to generate a link page 78, as shown in FIG. 4B, to access the website 80 hosted by the server 12 via the network 14, as indicated by block 82.

Upon accessing the website 80, as indicated by block 84, the reporter 45, a user, may enter the first information 42, as described above including the type of incident 48 and the location of the incident 50, into an incident report form 86, described in more detail below, within the website 80. Entering the first information 42 into the website form 86, may cause the processor of the user device 16 to supply the first information 42 to populate the incident report form 86, as discussed above, and indicated by block 88. The processor 18 may then select the one or more recipients 52 from the group of possible notification recipients 54 based on the first information 42, as described above and indicated by block 90. The processor 18 may then generate the notification 58 indicative of at least the type of incident 48 and the location of the incident 50, as discussed above and indicated by block 92. The processor 18 may then transmit the signal 62 indicative of the notification 58, or in some embodiments transmit the notification 58 directly, via the communications network 14 to the one or more recipients 52, as described above and indicated by block 94.

Figure 5A:
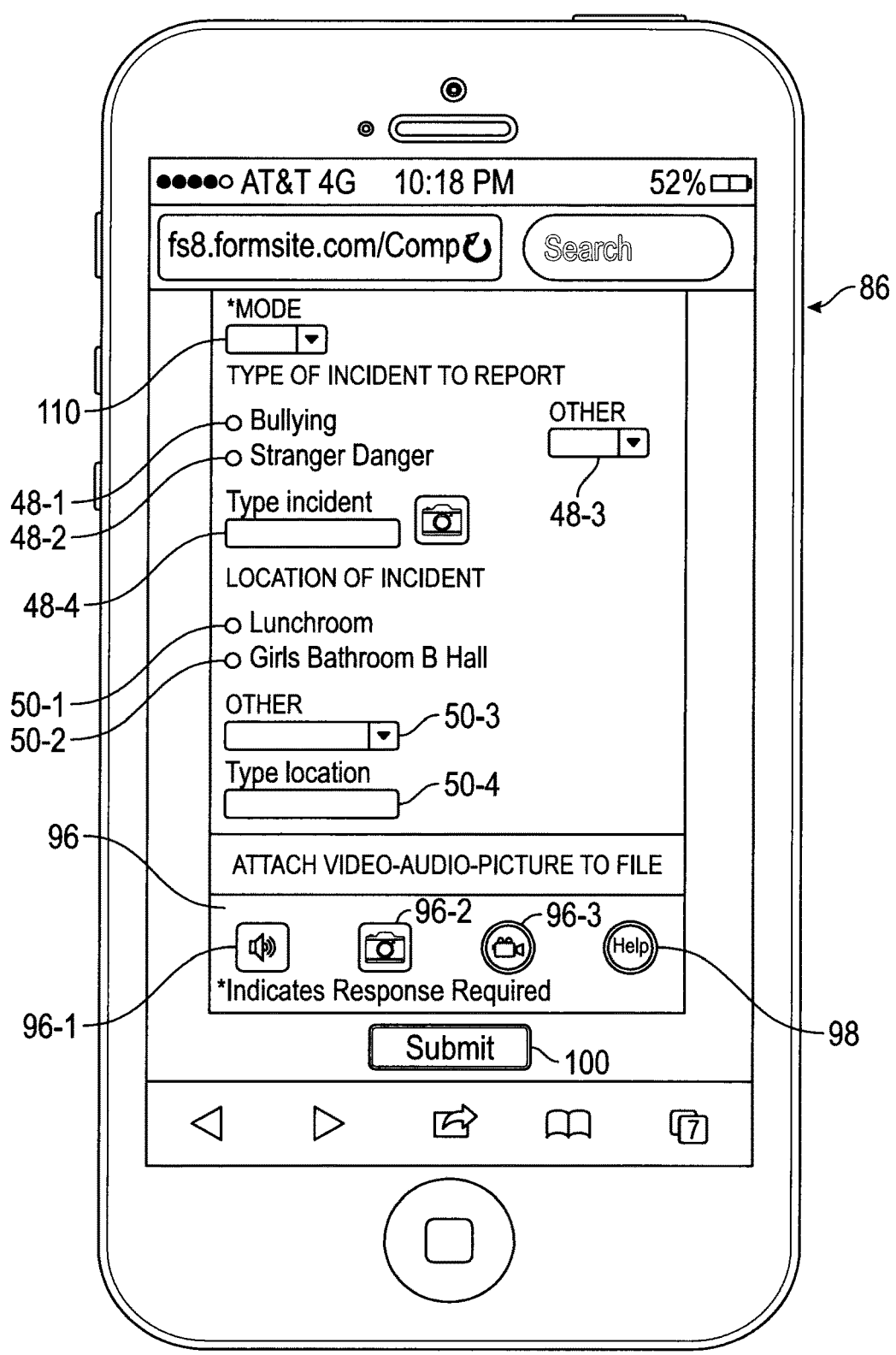
FIGS. 5A-5G depict exemplary screenshots generated by a user device executing one embodiment of the incident reporting and notification program in accordance with the inventive concepts disclosed herein.

An exemplary embodiment of the form 86 is shown in FIGS. 5A-D. The form 86 may enable the reporter 45 to quickly enter the first information 42 into the incident reporting and notification program 40-1, with limited free typing. In use, in this embodiment, the reporter 45 may initially select the type of incident 48 by clicking a radio button 48-1 or 48-2, selecting other types of incidents 48 from an incident menu 48-3, or by manually entering the type of incident 48 into a type of incident input field 48-4, as shown in FIG. 5A. The reporter 45 may then select the location of the incident 50 by clicking a radio button 50-1 or 50-2, selecting other locations of incidents 50 from a location menu 50-3, or by manually entering the location of the incident 50 into a location of the incident input field 50-4, as shown in FIG. 5A. The reporter 45 may additionally attach one or more file 96 to the incident report. For example, as shown in FIG. 5A, the one or more file 96 may be an audio recording 96-1, an image 96-2, a video recording 96-3, or any other appropriate file. The reporter 45 may also select a help option 98, which will be described in more detail below, if the reporter 45 is in danger. After entering the first information 42 into the form 86, the reporter 45 may then select a submit option 100 to transmit the first information 42 recorded in the form 86 to the processor 18 of the server 12, enabling the processor 18 to receive the first information 42.

Figure 5B:
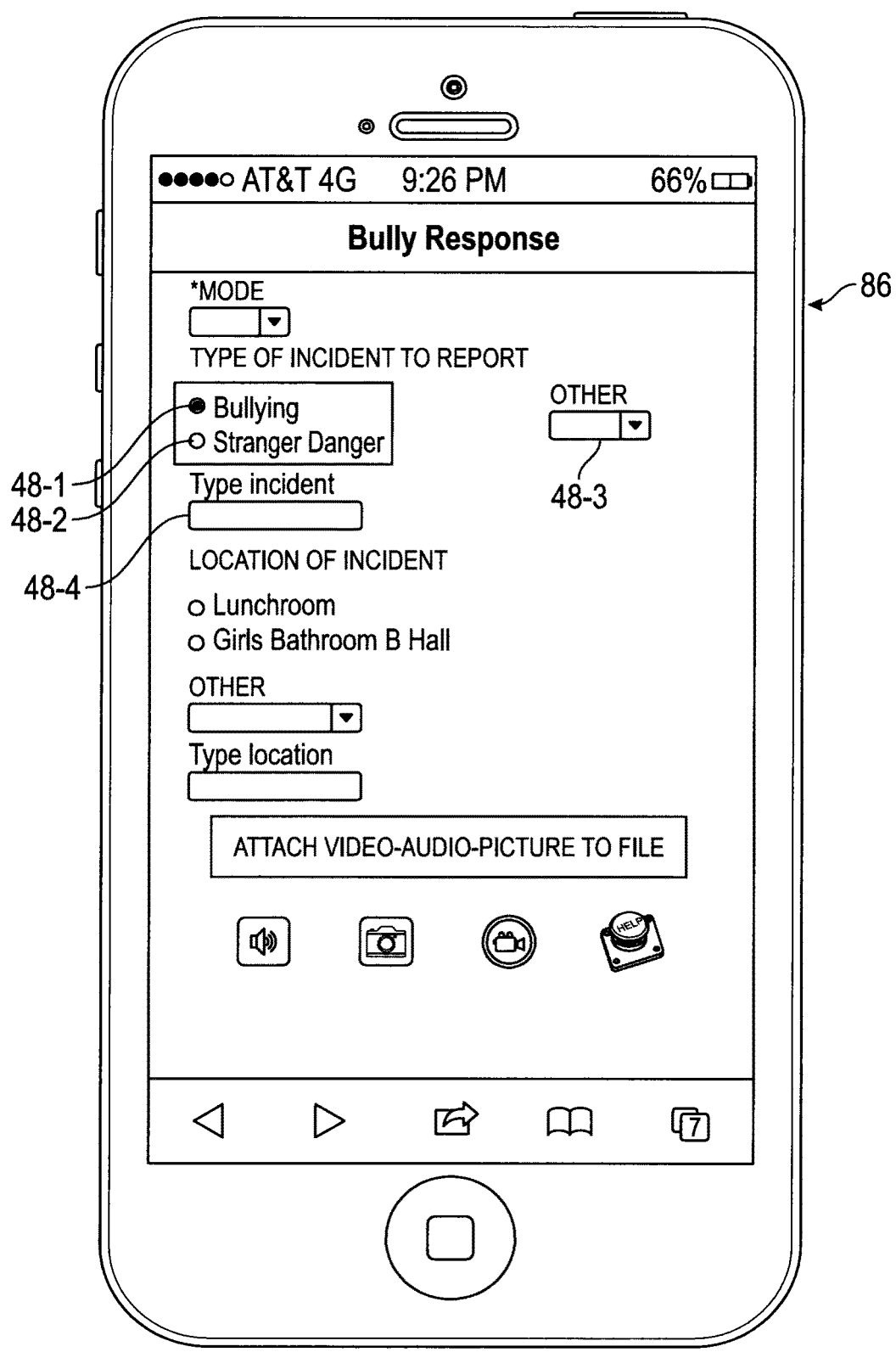
Figure 5C:
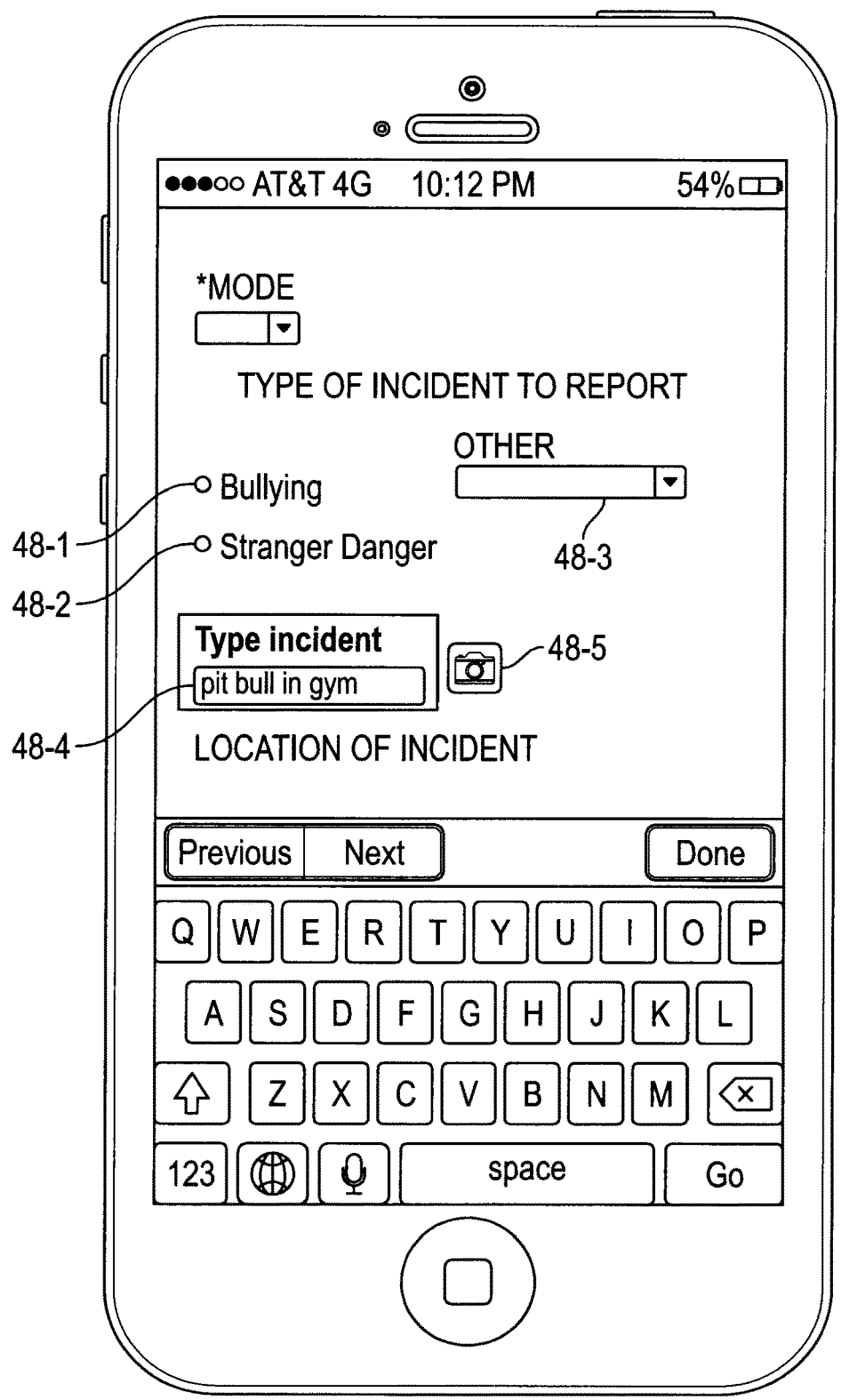

As depicted in the embodiment shown in FIG. 5B, selecting the radio button 48-1 may identify the type of incident 48 as a bullying incident. Selecting the incident menu 48-3, as shown in FIG. 5B, may enable the reporter 45 to select from the predetermined types of incident 48 described above, for example fighting, drugs, theft, or gang activity. Selecting the type of incident input field 48-4, as shown in FIG. 5C, may enable the reporter 45 to manually enter text, through a keyboard, voice, or other method; append a type of incident file 48-5, such as an audio recording, an image, or a video recording; or otherwise enter data which may be helpful in determining the type of incident 48. Selecting an option to append the type of incident file 48-5 may transfer the reporter 45 to an imaging program or device, such as a camera application on the user device 16, to capture an image and automatically append the image to the form 86, for example. In some embodiments, as shown in FIGS. 5A-C, the type of incident 48 may be entered through a combination of buttons, menu types, or data input fields. In other embodiments, the type of incident 48 may be entered through a single predetermined type of incident 48 menu, such as a set of radio buttons, a drop down menu, a scroll menu, a dial menu, or any other suitable menu, set of buttons, or set of icons, allowing selection between a predetermined set of types of incidents 48, in addition to the type of incident input field 48-4 which enables the reporter 45 to report and notify of incidents outside of the predetermined menu.

Figure 5D:
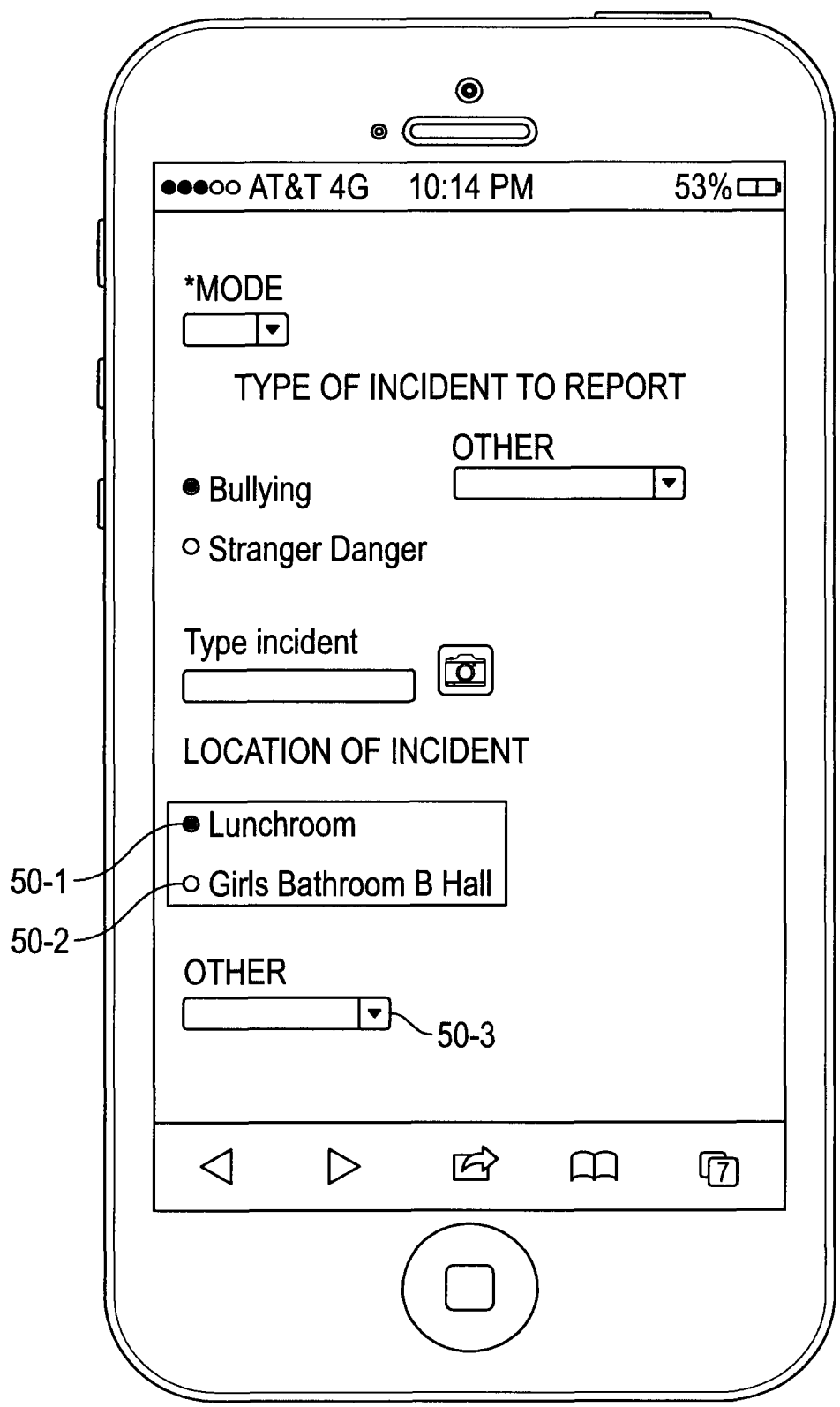

As depicted in the embodiment shown in FIG. 5D, prior to or after selecting the type of incident 48, the reporter 45 may select the radio button 50-1 to identify the location of the incident 50 as a lunchroom. Selecting the location menu 50-3 may enable the reporter 45 to select from the predetermined locations of incidents 50, described above, for example, a band room, an auditorium, a boy's dressing room, or a girl's dressing room. Selecting the location of the incident input field 50-4 may enable the reporter 45 to manually enter text or append files for the location of the incident 50 similar to the manner described for the type of incident input field 48-4. In one embodiment, the predetermined options for the location of the incident 50 may be collected into a single menu, set of radio buttons, or other format. In other embodiments, the location of the incident input field 50-4 may remain separate from the predetermined options for the location of the incident 50, similar to the type of incident input field 48-4, described above.

Figure 5E:
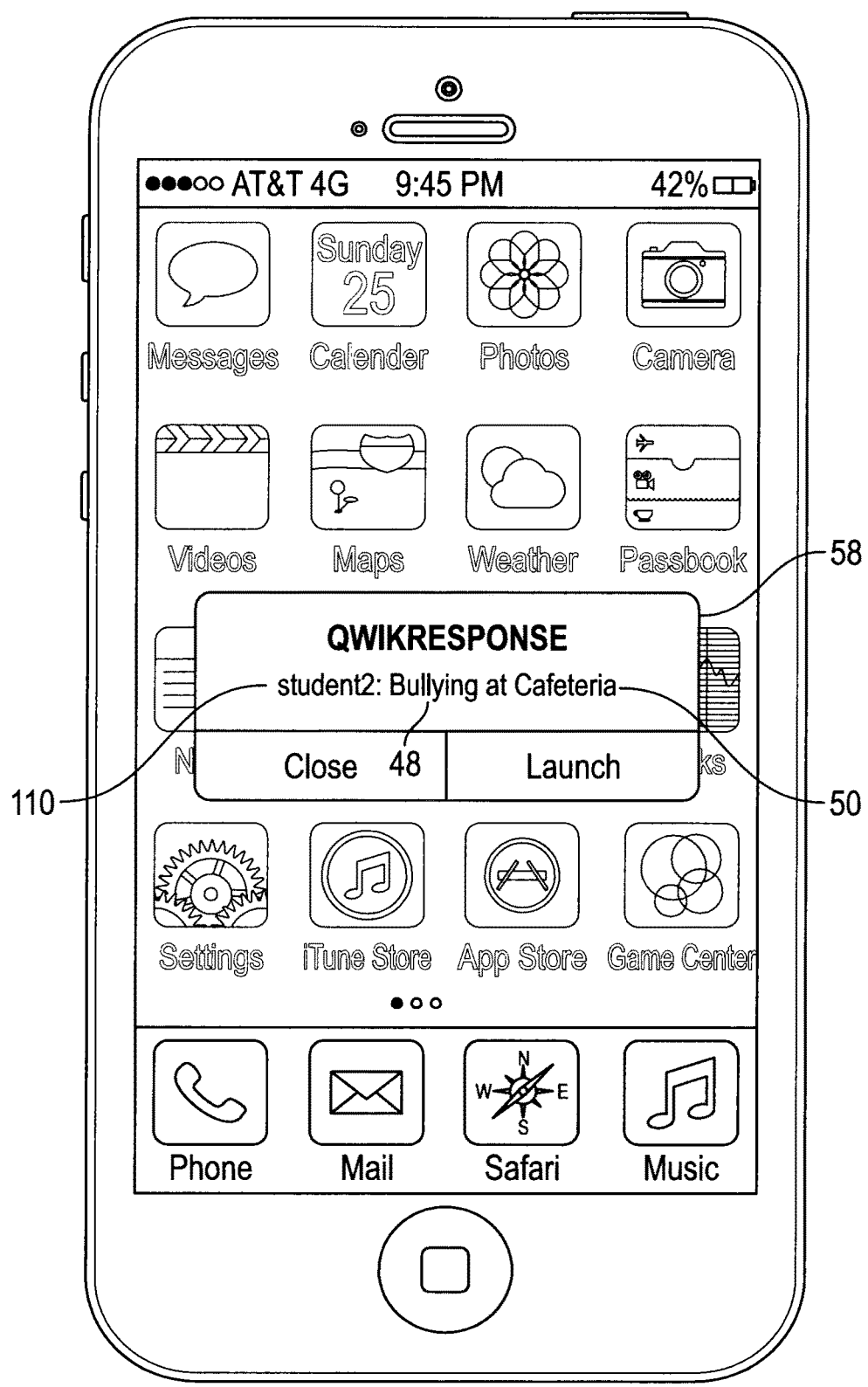
Figure 5F:
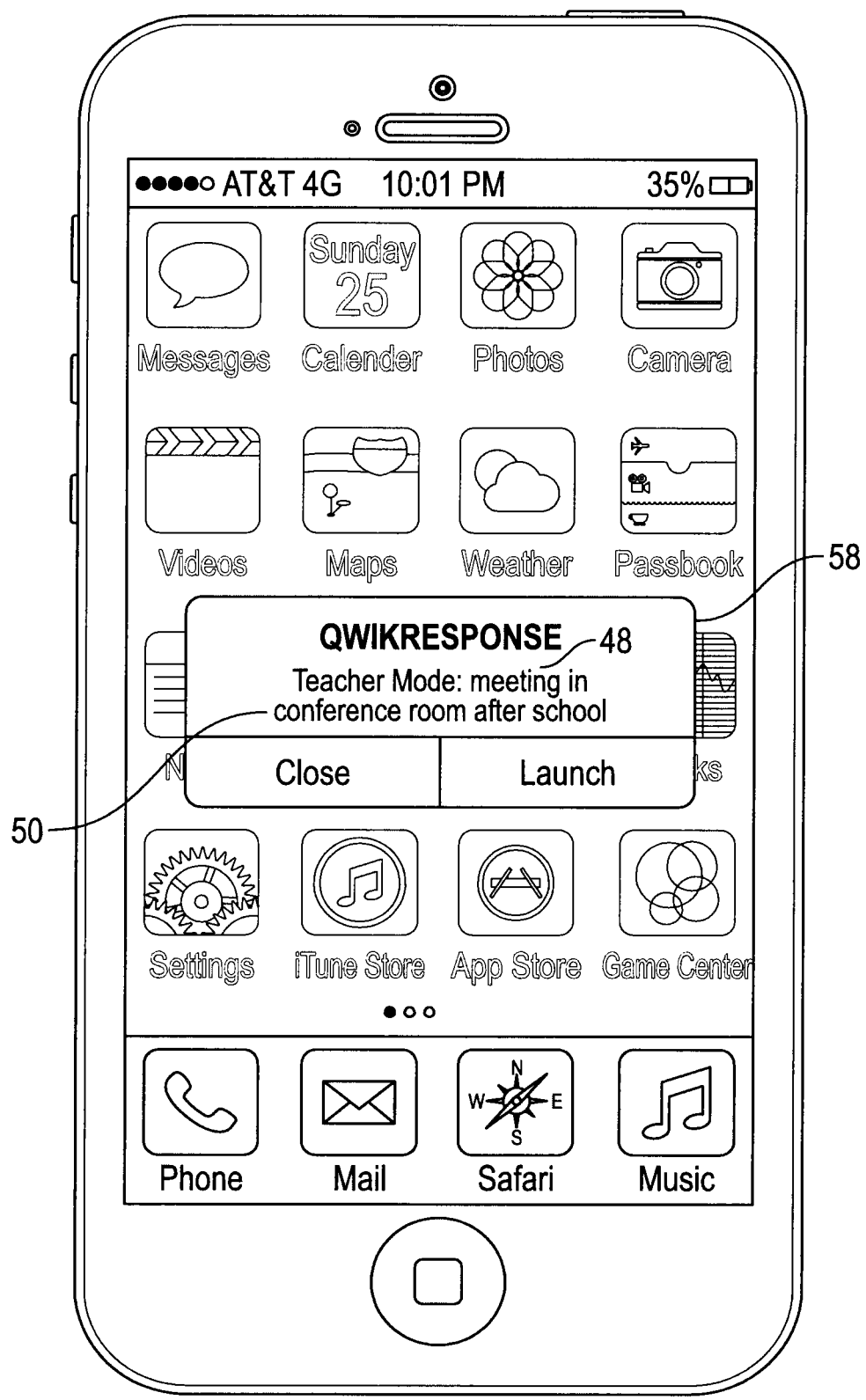
Figure 5G:
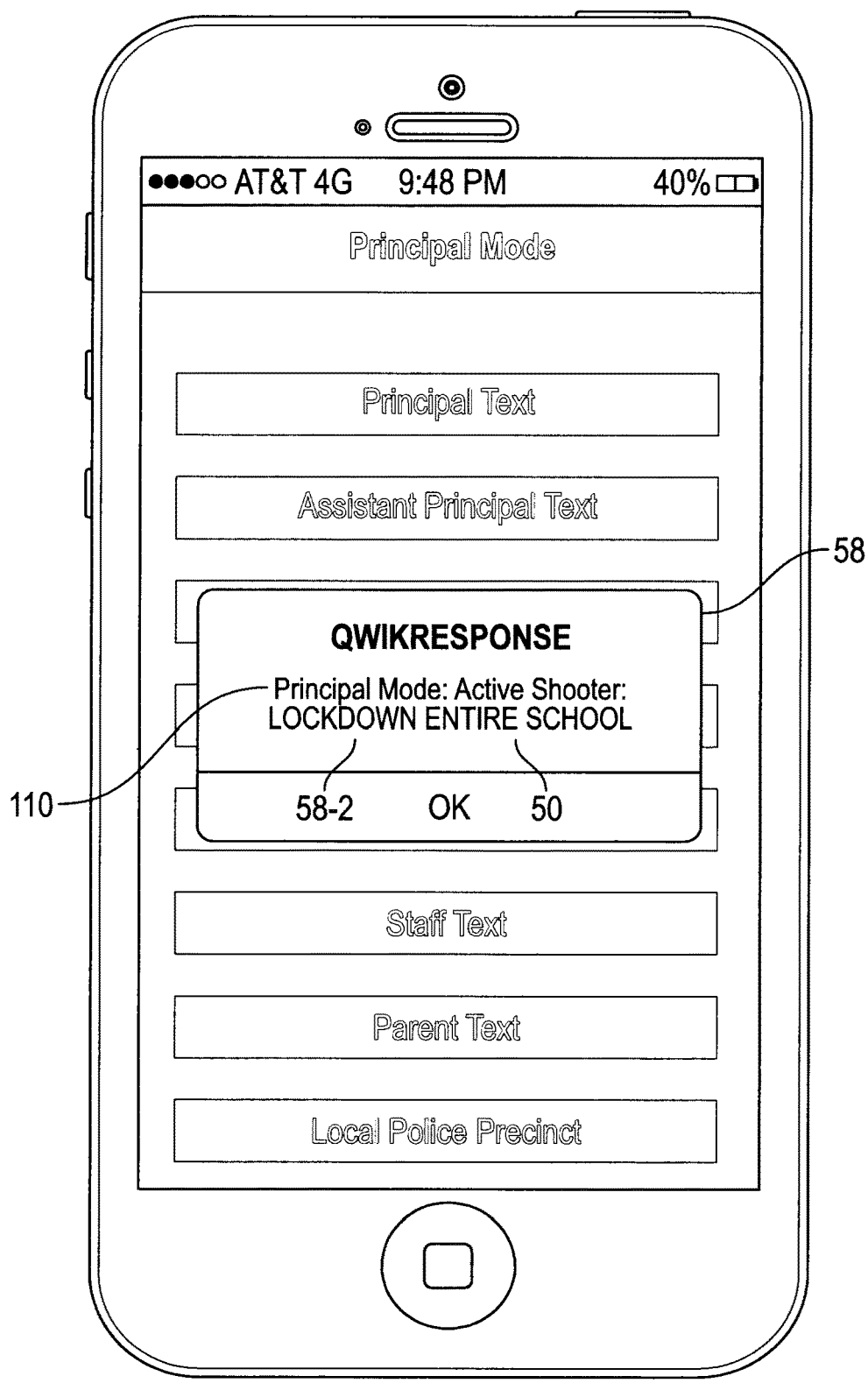

After transmitting the first information 42 through the form 86, using the submit option 100, the processor 18 of the server 12 may receive the first information 42, as discussed above. The processor 18 may select the one or more recipients 52 from the group of possible notification recipients 54 based on the first information 42, as discussed above, and factors relating to certain of the one or more recipients 52. Once the processor 18 has selected the one or more recipients 52, the incident reporting and notification program 40-1 may cause the processor to generate the notification 58 and transmit the signal 62 indicative of the notification 58 to the one or more recipient 52, as shown in FIGS. 5E-5G, and as discussed above. FIG. 5E shows an exemplary embodiment of the notification 58 where the type of incident 48 is bullying, the mode 110 is a school mode, and the location of the incident 50 is a lunchroom. FIG. 5F shows another exemplary embodiment of the notification 58, where the incident reporting and notification program 40-1 is used to enable a reporter 45 to issue reminders and notifications 58 indicative of meetings, events, or other incidents not related to violations of policy. In this embodiment, the notification 58 shows the type of incident 48 is a meeting, the location of the incident 50 is a conference room, and the one or more recipient 52 is a teacher, and the mode 110 is a teacher mode. FIG. 5G shows another exemplary embodiment of the notification 58, where the incident reporting and notification program 40-1 is used to cause an action 58-2. In this embodiment, the mode 110 is a principal mode and the action 58-2 is a lockdown, locking one or more doors of a school. The location of the incident 50, in this case is the area in which the action 58-2 is to take place, is the entire school.

In another embodiment, the form 86 may be stored within the incident reporting and notification program 40-1 stored on the user device 16, such that executing the incident reporting and notification program 40-1 stored on the user device 16 enables the user to enter the first information 42 into the form 86 on the user device 16, without connecting to the form 86 through the communication network 14, thereby causing the processor of the user device 16 to receive the first information 42. The first information 42 may be entered into the form 86, similarly to or the same as described above, without accessing the website 80. In some embodiments, the first information 42 may additionally include an identifier scan (e.g., a scan of a bar code) or image captured from an identification badge to auto fill at least a portion of the form 86. Once the first information 42 is entered into the form 86 stored on the user device 16, the processor of the user device 16 may transmit the first information 42 to the server. The server 12 may then select the one or more recipients 52, similar to the manner described above, generate the notification 58, and transmit the notification 58 or the signal 62 indicative of the notification 58 to the one or more recipients 52 as described above. In another embodiment, the user device 16 may select the one or more recipient 52, generate the notification 58, and transmit the notification 58 and a list of the one or more recipients 52 to the server 12 for identification of the one or more recipient 52 contact information and transmission of the notification 58 to the one or more recipient 52. In some embodiments, the user device 16 may receive the first information 42, in the form 86, select the one or more recipients 52, generate the notification 58, and transmit the notification 58 to the recipients 52, without direct use of the server 12.

In some embodiments, the incident reporting and notification program 40-1 may be executed simultaneously with one of the other programs 40-2 such as a camera application, voice recorder, or video recorder. Simultaneous execution with one of the other programs 40-2 may enable the reporter to append the one or more file 96 to the report, and may enable automatic and simultaneous uploading of images, audio recording, or video recording to the server 12, streaming to the website 80 or another website, or streaming/updating the notification 58 generated by the incident reporting and notification program 40-1 and transmitted to the one or more recipient 52.

The incident reporting and notification program 40-1, in some embodiments, may have authorized users selected from among the group of possible notification recipients 54 and reporters 45 which are authorized to edit the types of first information 42 that may be received by the incident reporting and notification program to tailor implementation of the incident reporting and notification program 40-1 to the setting, location, and types of incidents to be reported.

Figure 6A:
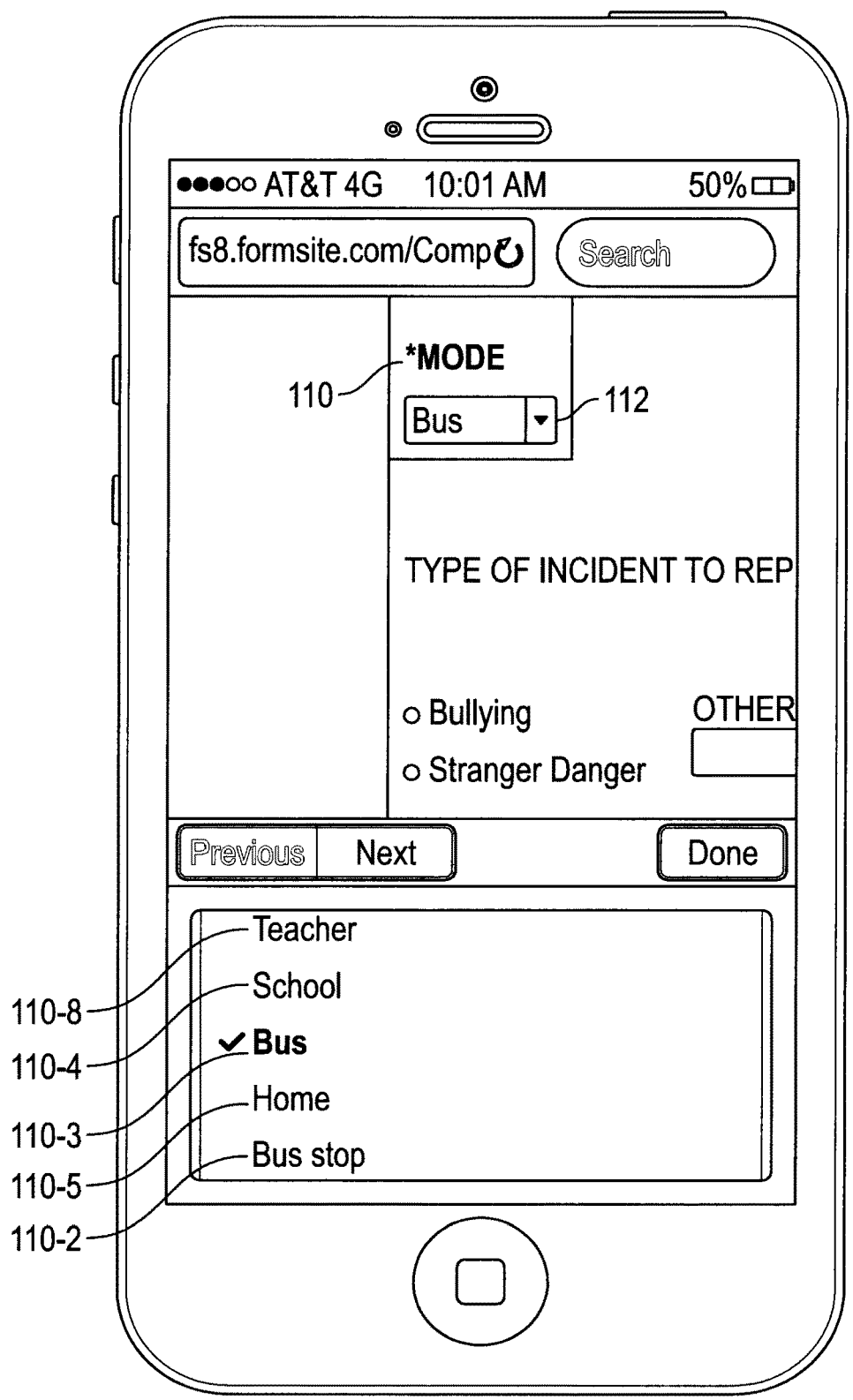
FIGS. 6A-6B depict exemplary screenshots generated by a user device executing one embodiment of the incident reporting and notification program in accordance with the inventive concepts disclosed herein.
Figure 6B:
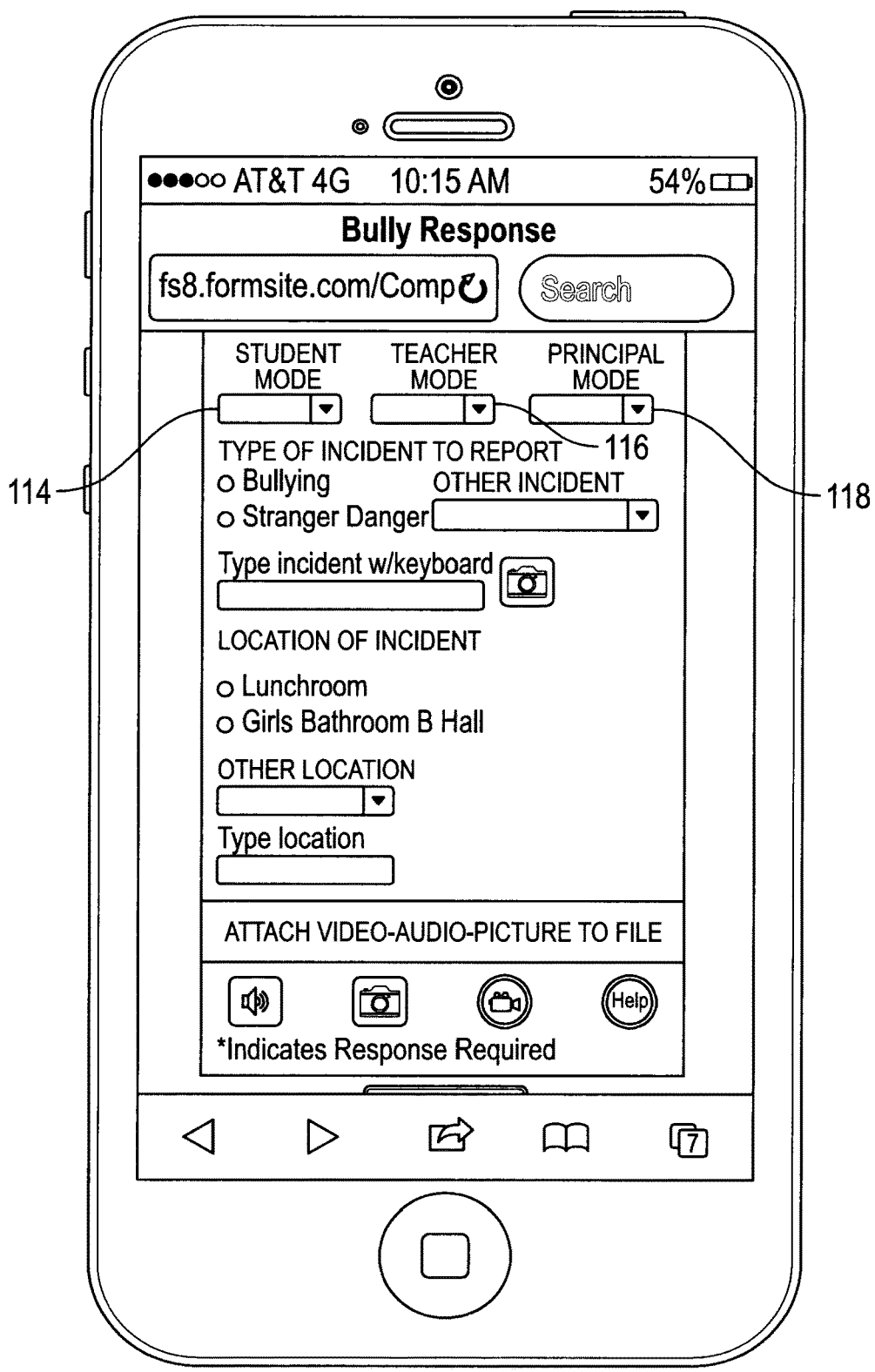

Referring now to FIGS. 5A, 6A, and 6B, in some embodiments, the incident reporting and notification program 40-1 may be provided with one or more modes 110, shown in FIG. 5A, which may enable different types of incident 48 and location of the incident 50 options based on the mode 110 selected at the time of reporting an incident. As shown in FIG. 6A, the one or more modes 110 may be selected from a general mode 110-1, a bus stop mode 110-2, a bus mode 110-3, a school mode 110-4, a home mode 110-5, an activity mode 110-6, an off hours mode 110-7, a staff mode 110-8, and a panic mode 110-9, as will be explained below in more detail. Additional modes may also be provided in the incident reporting and notification program 40-1, such as parent modes, staff modes, janitorial modes, supervisor modes, intern modes, and the like. In some embodiments, the one or more modes 110 may be selected by the user using the selection menu 112. The selection menu 112 may be implemented as a set of radio buttons, a drop down menu, a scrolling menu, a dial, or any other graphical implementation allowing the user to select an appropriate mode 110. In some embodiments, the one or more modes 110 may be selected automatically by the processor of the user device 16 and the incident reporting and notification program 40-1 based on a time of day, a global positioning system (GPS) determined location, a location determined by triangulation of a wireless communications signal by wireless communications one or more towers (e.g., a distance from a school, a location within a school, a location at or near a bus stop, etc.), by accessing or detection of a predetermined wireless network (e.g., a school's wireless network), or any other suitable method of automatically selecting the one or more mode 110. In some embodiments, the one or more modes 110 may be separated into modes with one or more authorization privileges, as will be described below. For example, as shown in FIG. 6B, the one or more modes 110 may be separated into a student mode 114, available to students; a teacher mode 116, available to teachers and school staff; and a principal mode 118, available only to principals or administrative staff.

The general mode 110-1 may include all of the type of incident 48 and location of the incident 50 options, as described above, allowing a user to report incidents of varying types and locations. The general mode 100-1 may also include authorizations specific to the user accessing the general mode 100-1. For example, in the school setting, a student having a disability requiring elevator access may have authorization to unlock/open elevator doors. Further, within the exemplary embodiment, the student may access and select a floor for the elevator using the general mode 100-1. The bus stop mode 110-2 may, for example, limit the location of the incident 50 options to one or more predetermined bus stops along a bus route taken by the user and may limit type of incident 48 options to those able to be performed at a bus stop. For example, the bus stop mode 110-2 may preclude reporting of teacher assault as not being able to occur at a bus stop. The bus mode 110-3 may limit the location of the incident 50 options to a bus on which the user rides and limit the type of incident 48 options similar to the bus stop mode 110-2.

The school mode 110-4 may enable all of the type of incident 48 options within the incident reporting and notification program 40-1 but may limit the location of the incident 50 options, for example, precluding selection of a bus stop or a bus.

The home mode 110-5 may limit the location of the incident 50 to an address associated with the user and may limit the one or more recipients 52 from the group of notification recipients 54 to those able to respond to an incident at the user's home such as a parent, a caregiver, or the police, for example.

The activity mode 110-6 may enable the addition of predetermined location of the incident 50 options associated with a scheduled school activity, such as a field trip, an away game, a band/orchestra competition, or the like. The activity mode 110-6 may also limit the one or more recipients 52 from the group of notification 54 recipients to those associated with the scheduled school activity, for example those teachers or coaches present at the school activity.

The off hours mode 110-7 may enable all of the type of incident 48 and location of the incident 50 options and additionally enable a time of incident option (not shown) which enables the user to manually enter a time of incident where that incident occurred prior to or in advance of the reporting. For example, the off hours mode 110-7 may be used to report of an incident which occurred prior to the reporting, when the user did not have access to the incident reporting and notification system 10. As another example, the off hours mode 110-7 may be used to report an incident of which the user has knowledge, such as a fight, which is scheduled to occur at a later time or after predetermined response hours (e.g., where students agree to meet for a fight on or near school grounds after the completion of the school day).

The staff mode 110-8, as with the general mode 110-1, which may also be separated between the teacher mode 116 and the principal mode 118, may include all of the type of incident 48 options and all of the location of the incident 50 options, and in addition may include additional notification and reporting options based on one or more authorization credentials or permissions. Access to the staff mode 110-8 may be limited to authorized personnel, for example, in the school setting embodiment, the staff mode 110-8 may be limited to administrative staff, teaching staff, security staff, and other school employees. The one or more authorization credentials may be based on employee position, employment status, or any other authorization credentials. The additional notification and reporting options may include access to loudspeaker announcements for notifications, access to automated door locks, access to automated window locks, access to sirens, and other notifications or actions which other than those which may be transmitted through to the user devices 16. With regards to the additional notification and reporting options, the options may include manually initiating the action 58-2 by the user selecting a selection indicative of the action 58-2 from a menu. For example, the administrative staff, such as a principal, may have the ability to put a school on lockdown, automatically locking all doors and windows, or a partial lockdown, locking doors and/or windows in a selected area. By way of an additional example, staff, such as teachers, lower level administrative staff, security, and other school officials, may have authorization to unlock a predetermined number of doors and/or windows, such as a teacher having permission to unlock her door, despite the administrative staff lockdown, such as unlocking the door for a student caught in the hall during lockdown. In some embodiments, manually initiating the action 58-2 by selecting the selection may cause the one or more networked system to perform the action 58-2 without the incident reporting and notification system 10 transmitting a notification to one or more user. The staff mode 110-8 may further be linked to options which enable addition or deletion of certain of the types of incident 48 options and location of the incident 50 options. In another embodiment, the staff mode 110-8 may enable authorized personnel to alert other authorized personnel of a test of the incident reporting and notification system 10 and initiate the test of the incident reporting and notification system 10. For example, in the school setting embodiment, the principal may schedule and notify teachers of a pending fire drill or lockdown test scenario prior to initiating the test scenario, thereby enabling teacher notification of the test scenario without providing undue notice to students. In this embodiment, the principal may thereby test the awareness and adherence of students to emergency procedures, such as exiting the school during a fire, without giving prior knowledge to students of the test scenario.

Additionally, some embodiments may be enabled with secondary notifications. For example, in some embodiments, the staff mode 100-8 may include secondary notifications which are sent to the reporter 45 depending on the type of incident 48 entered within the notification 58. For example, in the school setting or workplace setting, the secondary notifications may include first responder instructions, such as steps to be taken by first responders in common emergency situations. In this embodiment, authorized personnel, such as teachers or security, may have access to predetermined health information for students, employees, or other staff, such that health information, such as allergies, history of seizures, diabetes, or other ailments may be used in determining and supplying appropriate first responder instructions by the processor 18, in a similar manner as the processor 18 may determine the one or more recipients 88 from the group of notification recipients based on information stored in the one or more non-transitory processor readable medium 20. In some embodiments, the first information 44 may include a scan of or image captured of a student/employee/user identification badge to auto populate information to inform the secondary notifications.

The panic mode 110-9, which may also be accessed using the help option 98 discussed above, in one embodiment, may enable the user to report an emergency or panic incident with the selection of a single user interaction element, such as a button, toggle, or other user interaction element. The panic mode 110-9 may enable the user to select one or more recipients 52 from the group of notification recipients 54 or to enter a custom recipient or custom group of notification recipients. For example, in one embodiment, the user may enter the police, a significant other, an emergency contact, a car capable of having a horn or alarm triggered by the user device 16, or the like as a custom group of notification recipients or one of the aforementioned as a custom recipient. In use, the user may select the panic mode 110-9, for example, when exiting a building late at night, and press the user interaction element when the user encounters an incident, such as a potential robbery, rape, or assault. The user device 16 may then notify the one or more recipient 52 without further interface with the incident reporting and notification program 40-1. For example, when exiting a building at night, the user may toggle the user interaction element, when encountering a potential robbery, triggering the notification 58 which may notify the police, a significant other, and engage the alarm of the user's vehicle nearby.

Figure 7:
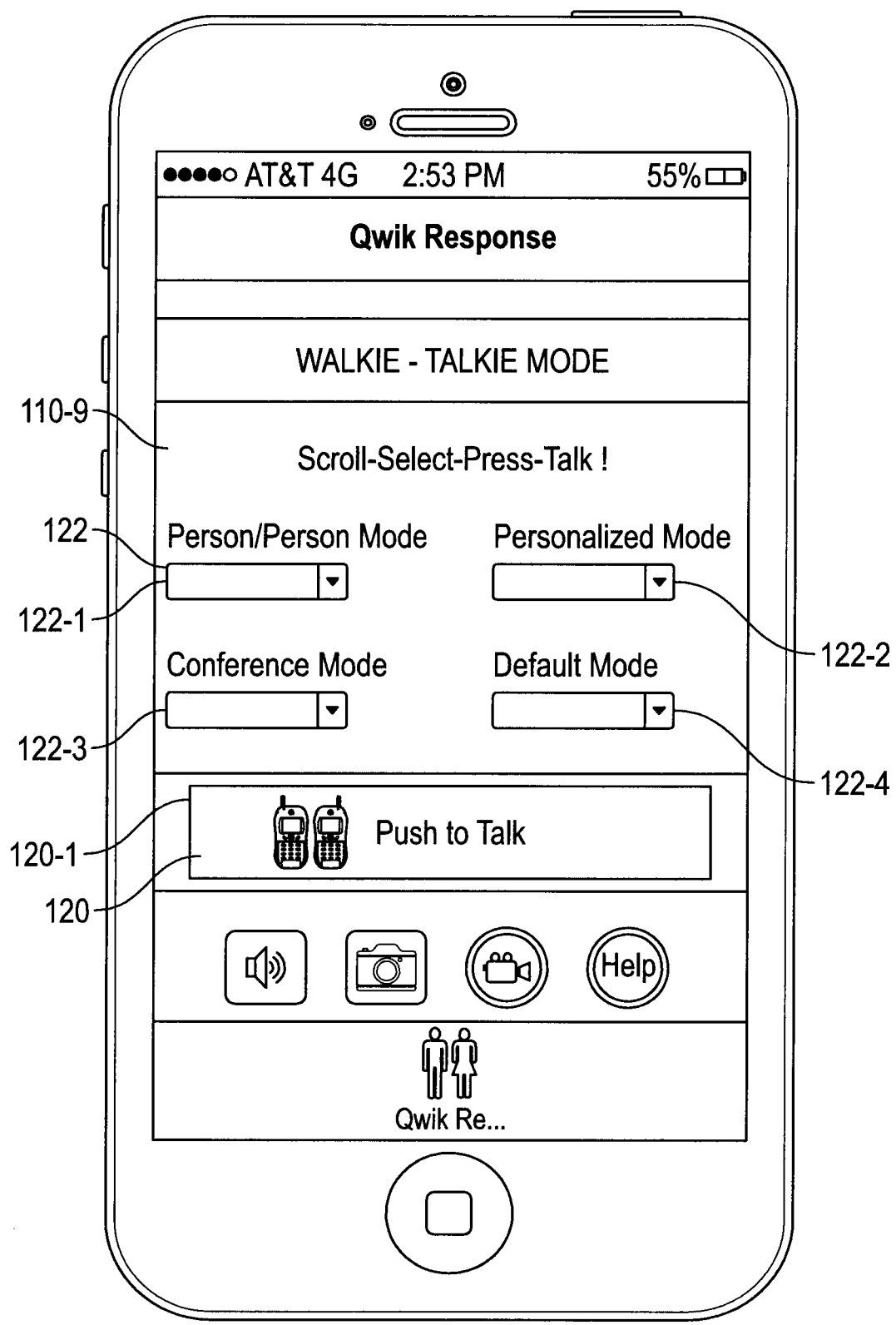
FIG. 7 depicts an exemplary screen shot generated by a user device executing one embodiment of the incident reporting and notification program in accordance with the inventive concepts disclosed herein.

In some embodiments, as shown in FIG. 7, the panic mode 110-9 may include processor executable instructions that when executed by the processor 18, cause the processor 18 to enable full duplex or half-duplex communication over the communications network 14 to the selected one or more recipients 52 from the group of notification recipients 54. In one embodiment, the processor executable instructions of the panic mode 110-9 may enable push-to-talk (PTT) communication for transmitting and receiving signals via a half-duplex communications system, in this case over the communications network 14. The half-duplex communications system provides communication in both directions, to and from the user and the selected one or more recipients 52, but allows communication in only one direction at any given instant of time. For example, once the selected one or more recipients 52 begins receiving a signal from the user, the selected one or more recipient 52 waits for the user to cease transmission before replying.

Using PTT communication in the panic mode 110-9, the user may interact with a user interaction element 120 to enable the user to transmit a first voice broadcast to the selected one or more recipients 52 while maintaining contact with the user interaction element 120. The user is able to receive a second voice broadcast from the selected one or more recipients 52 after releasing the user interaction element 120. The processor executable instructions may include instructions integrating half-duplex PTT communication functionality into the panic mode 110-9, in some embodiments. In other embodiments, the processor executable instructions may include instructions which enable interaction between the panic mode 110-9 and a second application on the user device 16, where the second application enables half-duplex communication using PTT. In this embodiment, interaction with the user interaction element 120 within the panic mode 110-9 enables the user to communicate, via half-duplex communication using the PTT functionality of the second application, while remaining within the user interface of the panic mode 110-9. In yet other embodiments, the processor executable instructions may cause the user to access the second application on the user device 16 and interact with the second application during a PTT communication session. In this embodiment, when the user terminates the PTT interaction in the second application, the processor executable instructions may cause the user to be redirected back to the panic mode 110-9 without further user input.

The user interaction element 120 may be a physical element such as a button, a toggle, or other physical user interaction element. For example, the user interaction element 120 may be a button or switch located on an exterior of the user device 16, such as the input device 24, shown in FIG. 1. In other embodiments, the user interaction element 120 may be a graphical interaction element on a touch screen input/output device, such as a graphically represented button, toggle, switch, or other graphical user interaction element. For example, the user interaction element 120 may be a graphically represented button 120-1, shown in FIG. 7.

In some embodiments, prior to interacting with the user interaction element 120, the user may be prompted to select the selected one or more recipients 52 from the group of possible notification recipients 54. Contact information for the group of possible notification recipients 54, used to establish communication between the user and the selected one or more recipients 52, may be stored in a database, for example, or as explained below in more detail. As shown in FIG. 7, the user may interact with one or more selection menu 122 to select the one or more recipients 52. The one or more selection menu 122 may be implemented as a set of radio buttons, a drop down menu, a scroll menu, a dial menu, or any other suitable menu, set of buttons, or set of icons, allowing selection between predetermined sets of contact information. In some embodiments, the processor executable instructions may enable the user to enter contact information from the input 24 of the user device 16, such as entering a telephone number using a physical or virtual keyboard.

As shown, the user may select the selected one or more recipient 52 from a first selection menu 122-1 to select a single individual with whom to communicate. The first selection menu 122-1 may be a person-to-person menu representative of contact information stored in the user device, within the incident reporting and notification system 10, within the second application on the user device 16, or within other processor readable medium with which the processor 18 is in communication. The user may select the selected one or more recipients 52 from a second selection menu 122-2 or a third selection menu 122-3, where the second and third selection menus 122-2 and 122-3 enable communication with a plurality of selected recipients 52. As shown, the second selection menu 122-2 may represent a subset of the contact information, stored in the user device, within the incident reporting and notification system 10, within the second application on the user device 16, and/or within other processor readable medium with which the processor 18 is in communication, such as a database. The subset of the contact information representative of a personalized set of contacts and/or contact information selected by the user. The third selection menu 122-3 may represent a subset of the contact information, similar to that of the second selection menu 122-2, but selected by a party other than the user, for example the user's employer, facility manager, the incident reporting and notification system 10, or other entity or program. In some embodiments, a fourth selection menu 122-4 may be a default selection menu with options and/or sets of contact information predetermined by the incident reporting and notification system 10, enabling the user to select between the options and/or sets of contact information.

In another embodiment, the processor 18 may select the selected one or more recipients 52 based on one or more criterion without further interaction by the user. In some embodiments, the user may enable the processor 18 to select the one or more recipients 52 by selecting the fourth selection menu 122-4. The fourth selection menu 122-4 may be implemented as one or more radio button, a drop down menu, a scroll menu, a dial menu, or any other suitable menu, button, set of buttons, or the like allowing the user to enable and/or instruct the processor 18 to select the one or more recipients 52. For example, where implemented as a drop down menu, the user may be prompted to select a criterion on which the processor 18 may select the selected one or more recipients 52, such as the type of incident 48, the location of the incident 50, the time, the identification information, or the other information. Where implemented as a radio button with a single option, selection of the fourth selection menu 122-4 may enable the processor 18 to select the one or more recipient 52 based on one or more criterion prioritized by the processor 18 or predetermined by the incident reporting and notification system 10, such as, previously entered information such as the type of incident; previously selected individuals or groups; last contacted individuals or groups; prompted options such as the type of incident; or other criterion, for example.

In use, in some embodiments, the incident reporting and notification program 40-1 may also enhance anonymity in use of the program 40-1. The program 40-1 may be provided with a predetermined set design options or skins to enable the program 40-1, in use, to mimic or resemble another program. Additionally, where the program 40-1 has an icon on a user device 16, the icon may be provided with a predetermined set of design options or skins to enable the icon to resemble or mimic another program.

Further, in some embodiments, the program 40-1 may be implemented such that selecting one or more physical buttons, toggles, or switches on the user device 16 may cause the program 40-1 to switch from the incident reporting and notification program 40-1 to one of the other programs 40-2, such as an internet browser, a game, or an entertainment application (i.e., video player, stored movie, etc.), for example. In this manner, the incident reporting and notification program 40-1 may enable the reporter 45 a form of anonymity when the user device 16 is observed or about to be observed by another. In some embodiments, switching from the incident reporting and notification program 40-1 to one of the other programs 40-2 may cause the other program to open to a point in execution of the program 40-2 other than an initiation or loading point. For example, switching from the incident reporting and notification program 40-1 to a movie player, by clicking an increase volume button on the user device 16, may cause the movie player to begin at a previously paused point in a movie playback. In some embodiments, selecting differing buttons, toggles, or switches may cause the user device to change to different one or more other programs 40-2 depending on the selection. For example, the increase volume button may switch to a movie player, a down volume button may switch to an internet browser with an image of the last website visited, and ringer/vibrate switch may redirect the user device to a game application at a continuation point or a point at which the reporter 45 must restart a level upon failure of an objective. Switching to one or more other program 40-2 may provide the reporter anonymity from discovery by a casual observer or obfuscation from an intentional observer.

Although a few embodiments of the present disclosure have been described in detail above, those of ordinary skill in the art will readily appreciate that many modifications are possible without materially departing from the teachings of the present disclosure. Accordingly, such modifications are intended to be included within the scope of the present disclosure as defined in the claims.

What is claimed is:

1. One or more non-transitory processor readable medium, operably coupled to one or more processors, the one or more non-transitory processor readable medium storing processor executable instructions, which when executed by the processor, causes the processor to:
receive first information indicative of an incident report by a reporter, the first information of the incident report indicating at least a type of incident which violates one or more policies and a location of the incident;
select one or more recipients from a group of notification recipients based on the first information;
generate a notification indicative of the type of incident and the location of the incident;
transmit a signal via a communications network indicative of the notification; and
transmit a signal via a second network to cause one or more networked system to perform an action of automatically locking at least one door and window upon receipt of the notification; the action based on the first information of the incident report.

2. The one or more non-transitory processor readable medium of claim 1, wherein the location of the incident is determined by a global positioning system.

3. The one or more non-transitory processor readable medium of claim 1, wherein the one or more recipients from the group of notification recipients includes all of the group of notification recipients.

4. The one or more non-transitory processor readable medium of claim 1, wherein the notification is transmitted as a push notification.

5. The one or more non-transitory processor readable medium of claim 1, wherein the notification further comprises information, indicative of the incident, selected from the group consisting of: a photo, a video recording, and an audio recording.

6. An incident reporting and notification system, comprising:
one or more processor configured to execute processor executable instructions;
one or more imaging device operably coupled to the one or more processor; and
one or more non-transitory processor readable medium, operably coupled to the one or more processor and the one or more imaging device, the one or more non-transitory processor readable medium storing processor executable instructions, which when executed by the processor, causes the processor to:
receive an image indicative of an identifier linked to a website; access the website via the identifier through a communications network, the website configured to receive information, of an incident, indicative of at least a type of incident which violates one or more policy and a location of the incident into an incident report form;
supply first information, indicative of the incident and entered by a user, to populate the incident report form; and
transmit a signal via a second network to cause one or more networked system to perform an action of automatically locking at least one door and window upon receipt of the notification; the action based on the first information of the incident report.

7. The incident reporting and notification system of claim 6, wherein the location of the incident is determined by a global positioning system.

8. The incident reporting and notification system of claim 6, wherein the first information comprises information, indicative of the incident, selected from a group consisting of: text, a photo, a video recording, and an audio recording.

9. An incident reporting and notification system, comprising:
one or more processor configured to execute processor executable instructions; and
one or more non-transitory processor readable medium, operably coupled to the one or more processor, the one or more non-transitory processor readable medium storing processor executable instructions, which when executed by the processor, causes the processor to:
receive first information indicative into an incident report form, the first information comprising at least a type of incident which violates one or more policies and a location of the incident; generate a notification indicating the type of incident and the location of the incident;
transmit a signal over a communications network to a server which transmits the signal to one or more user devices of one or more recipients selected by the server from a group of notification recipients, the signal indicative of the notification; and
transmit a signal via a second network to cause one or more networked system to perform an action of automatically locking at least one door and window upon receipt of the notification; the action based on the first information of the incident report.

10. The incident reporting and notification system of claim 9, wherein the processor executable instructions further cause the processor to select one or more recipients from a group of notification recipients based on the first information.

11. The incident reporting and notification system of claim 9, wherein the location of the incident is determined by a global positioning system.

12. The incident reporting and notification system of claim 9, wherein the one or more recipients from the group of notification recipients includes all of the group of notification recipients.

13. The incident reporting and notification system of claim 9, wherein the notification is transmitted as a push notification.

14. The incident reporting and notification system of claim 9, wherein the notification further comprises information, indicative of the incident, selected from the group consisting of: a photo, a video recording, and an audio recording.

* * * * *

UNITED STATES PATENT AND TRADEMARK OFFICE
CERTIFICATE OF CORRECTION

PATENT NO. : 10,313,144 B2
APPLICATION NO. : 14/298512
DATED : June 4, 2019
INVENTOR(S) : Lennie Earl Franks and Genesis Junia Franks Page 1 of 1

It is certified that error appears in the above-identified patent and that said Letters Patent is hereby corrected as shown below:

In the Specification
Column 8, Line 39: Delete "hi-directionally" and replace with -- bi-directionally --

Signed and Sealed this
Twenty-third Day of July, 2019

Andrei Iancu
*Director of the United States Patent and Trademark Office*